United States Patent
Zhang et al.

(10) Patent No.: US 7,801,330 B2
(45) Date of Patent: Sep. 21, 2010

(54) TARGET DETECTION AND TRACKING FROM VIDEO STREAMS

(75) Inventors: Zhong Zhang, Herndon, VA (US); Yongtong Hu, Herndon, VA (US); Alan J. Lipton, Herndon, VA (US); Peter L. Venetianer, McLean, VA (US); Li Yu, Herndon, VA (US); Weihong Yin, Herndon, VA (US)

(73) Assignee: ObjectVideo, Inc., Reston, VA (US)

( * ) Notice: Subject to any disclaimer, the term of this patent is extended or adjusted under 35 U.S.C. 154(b) by 743 days.

(21) Appl. No.: 11/700,007

(22) Filed: Jan. 31, 2007

(65) Prior Publication Data

US 2007/0127774 A1    Jun. 7, 2007

Related U.S. Application Data

(63) Continuation-in-part of application No. 11/165,435, filed on Jun. 24, 2005.

(51) Int. Cl.
*G06K 9/00* (2006.01)
*H04N 7/18* (2006.01)
*H04N 5/225* (2006.01)

(52) U.S. Cl. .................. 382/103; 348/143; 348/169

(58) Field of Classification Search ................ 382/103, 382/104, 107, 197, 228; 348/143–160, 169–172; 345/419
See application file for complete search history.

(56) References Cited

U.S. PATENT DOCUMENTS

| | | |
|---|---|---|
| 6,625,310 B2 | 9/2003 | Lipton et al. |
| 6,696,945 B1 | 2/2004 | Venetianer et al. |
| 6,856,696 B1 * | 2/2005 | Ajioka .................... 382/173 |
| 6,999,600 B2 | 2/2006 | Venetianer et al. |
| 2001/0015409 A1 * | 8/2001 | Mahler et al. ............... 250/342 |
| 2004/0151342 A1 | 8/2004 | Venetianer et al. |
| 2005/0162515 A1 | 2/2005 | Venetianer et al. |
| 2005/0169367 A1 | 4/2005 | Venetianer et al. |
| 2005/0104958 A1 | 5/2005 | Egnal et al. |
| 2005/0146605 A1 | 7/2005 | Lipton et al. |
| 2006/0170769 A1 | 8/2006 | Zhou |
| 2006/0239506 A1 | 10/2006 | Zhang et al. |
| 2006/0268111 A1 | 11/2006 | Zhang et al. |
| 2006/0291695 A1 | 12/2006 | Lipton et al. |
| 2007/0003141 A1 | 1/2007 | Rittscher et al. |
| 2007/0013776 A1 | 1/2007 | Venetianer et al. |
| 2007/0279494 A1 * | 12/2007 | Aman et al. ................. 348/169 |
| 2008/0107304 A1 * | 5/2008 | Coulter et al. .............. 382/103 |

OTHER PUBLICATIONS

C. Stauffer, W.E.L. Grimson, "Learning Patterns of Activity Using Real-Time Tracking," IEEE Trans. PAMI, 22(8):747-757, Aug. 2000.

(Continued)

*Primary Examiner*—Aaron W Carter
(74) *Attorney, Agent, or Firm*—Venable LLP; Michael A. Sartori; Yao Wang

(57) ABSTRACT

A technique for video processing includes: receiving video from a scene; detecting moving pixels in the video; detecting line segments or motion blocks in the video based on the detected moving pixels; identifying targets in the video based on the detected line segments or motion blocks; tracking targets in the video based on the identified targets; and managing the tracked targets in the video.

15 Claims, 38 Drawing Sheets

OTHER PUBLICATIONS

R. Collins, A. Lipton, H. Fujiyoshi, and T. Kanade, "Algorithms for Cooperative Multisensor Surveillance," Proceedings of the IEEE, vol. 89, No. 10, Oct. 2001, pp. 1456-1477.

U.S. App. No. 11/139,986, filed May 31, 2005 by Zang et al., entitled: Human Detection and Tracking for Security Applications.

International Search Report mailed Apr. 5, 2007 issued in Application No. PCT/US06/24485.

International Search Report mailed Jun. 3, 2009 from corresponding International Application No. PCT/US2008/01167.

Massachusetts Institute of Technology Media Lab, "Real-Time Tracking of the Human Body," http://vismod.media.mit.edu/vismod/demos/pfinder, [retrieval date Dec. 22, 2006].

* cited by examiner

FIG. 24A
FIG. 24B
FIG. 24C
FIG. 24D
FIG. 24E
FIG. 24F
FIG. 24G
FIG. 24H
FIG. 24I

TARGET DETECTION AND TRACKING FROM VIDEO STREAMS

CROSS-REFERENCE TO RELATED PATENTS AND PATENT PUBLICATIONS

This application claims priority to U.S. patent application Ser. No. 11/165,435, filed on Jun. 24, 2005, commonly assigned, entitled "Target Detection and Tracking from Overhead Video Streams," by Lipton et al., the subject matter of which is incorporated herein by reference in its entirety.

The following patents and publications, the subject matter of each is being incorporated herein by reference in its entirety, are mentioned:

U.S. Pat. No. 6,999,600, issued Feb. 14, 2006, by Venetianer et al., entitled "Video Scene Background Maintenance Using Change Detection and Classification,"

U.S. Pat. No. 6,625,310, issued Sep. 23, 2003, by Lipton et al., entitled "Video Segmentation Using Statistical Pixel Modeling,"

U.S. Pat. No. 6,696,945, issued Feb. 24, 2004, by Venetianer et al., entitled "Video Tripwire,"

U.S. Published Patent Application No. 20060268111, filed May 31, 2005, by Zhang et al., entitled "Multi-State Target Tracking,"

U.S. Published Patent Application No. 20060239506, filed Apr. 25, 2005, by Zhang et al., entitled "Line Textured Target Detection and Tracking with Applications to 'Basket-run' Detection,"

U.S. Published Patent Application No. 20050169367, filed Apr. 5, 2005, by Venetianer et al., entitled "Video Surveillance System Employing Video Primitives,"

U.S. Published Patent Application No. 20050162515, filed Feb. 15, 2005, by Venetianer et al., entitled "Video Surveillance System,"

U.S. Published Patent Application No. 20050146605, filed Nov. 15, 2001, by Lipton et al., entitled "Surveillance System Employing Video Primitives,"

U.S. patent application Ser. No. 11/139,986, filed May 31, 2005, by Zhang et al., entitled "Human Detection and Tracking for Security Applications,"

C. Stauffer, W. E. L. Grimson, "Learning Patterns of Activity Using Real-Time Tracking,"IEEE Trans. PAMI, 22(8): 747-757, Aug. 2000, and R. Collins, A. Lipton, H. Fujiyoshi, and T. Kanade, "Algorithms for Cooperative Multisensor Surveillance," Proceedings of the IEEE, Vol. 89, No. 10, October, 2001, pp. 1456-1477.

FIELD OF THE INVENTION

The invention relates to video surveillance systems and video verification systems. Specifically, the invention relates to a video surveillance system that may be configured to detect and track individual targets in video streams.

BACKGROUND OF THE INVENTION

Video surveillance is of critical concern in many areas of life. One problem with video as a surveillance tool is that it may be manually intensive to monitor. Recently, solutions have been proposed to solve some problems of automated video monitoring with the intelligent video surveillance systems. Such solutions are described, for example, in U.S. Pat. No. 6,696,945, or U.S. Published Patent Application No. 20050146605, identified above. One application of video surveillance is the detection of human beings and their behaviors. Unfortunately, the science of computer vision, which is the basis of the automated video monitoring, has limitations with respect to recognizing individual targets in fields of views of the video cameras, such as those used in residential, commercial, and home monitoring applications.

Current video surveillance systems such as described, for example, in C. Stauffer, W. E. L. Grimson, "Learning Patterns of Activity Using Real-Time Tracking," and R. Collins, A. Lipton, H. Fujiyoshi, and T. Kanade, "Algorithms for Cooperative Multisensor Surveillance," identified above, have two basic limitations. First, groups of targets may often be crowded together and detected as a single "blob." The blob may be correctly labeled as "human group," but the number of individuals in the group may not be ascertained. Second, other inanimate objects, such as, for example, furniture, strollers, and shopping carts, may generally not be disambiguated from legitimate targets (particularly in, for example, overhead camera shots). In addition, other "human detection" algorithms such as, for example, the techniques discussed in U.S. patent application Ser. No. 11/139,986, identified above, rely on more oblique camera views and specific human models to recognize humans, but might not perform well for overhead camera views.

SUMMARY OF THE INVENTION

One exemplary embodiment of the invention includes an apparatus for video processing, the apparatus is configured to perform operations comprising: receiving video of a scene; detecting moving pixels in the video; detecting line segments or motion blocks in the video based on the detected moving pixels; identifying targets in the video based on the detected line segments or motion blocks; tracking targets in the video based on the identified targets; and managing the tracked targets in the video.

One exemplary embodiment of the invention includes an apparatus for video processing, the apparatus is configured to perform operations comprising: calibrating a video camera; monitoring an area of interest with the video camera; receiving video of the area of interest from the video camera; detecting moving pixels in the video; detecting line segments or motion blocks in the video based on the detected moving pixels; identifying targets in the video based on the detected line segments or motion blocks; tracking targets in the video based on the identified targets; and managing the tracked targets in the video.

One exemplary embodiment of the invention includes a computer system to perform a method for video processing, the method comprising: receiving video of a scene; detecting moving pixels in the video; detecting line segments or motion blocks in the video based on the detected moving pixels; identifying targets in the video based on the detected line segments or motion blocks; tracking targets in the video based on the identified targets; and managing the tracked targets in the video.

One exemplary embodiment of the invention includes a method for video processing, comprising: receiving video of a scene; detecting moving pixels in the video; detecting line segments or motion blocks in the video based on the detected moving pixels; identifying targets in the video based on the detected line segments or motion blocks; tracking targets in the video based on the identified targets; and managing the tracked targets in the video.

One exemplary embodiment of the invention includes a video processing apparatus, comprising: means for receiving video of a scene; means for detecting moving pixels in the video; means for detecting line segments or motion blocks in the video based on the detected moving pixels; means for identifying targets in the video based on the detected line segments or motion blocks; means for tracking targets in the video based on the identified targets; and means for managing the tracked targets in the video.

BRIEF DESCRIPTION OF THE DRAWINGS

The foregoing and other features and advantages of the invention will be apparent from the following, more particular description of the embodiments of the invention, as illustrated in the accompanying drawings.

FIGS. 24A-24I illustrate exemplary processing results for the blocks in the flow diagram of FIG. 23 according to an exemplary embodiment of the invention.

DEFINITIONS

Figure 1:
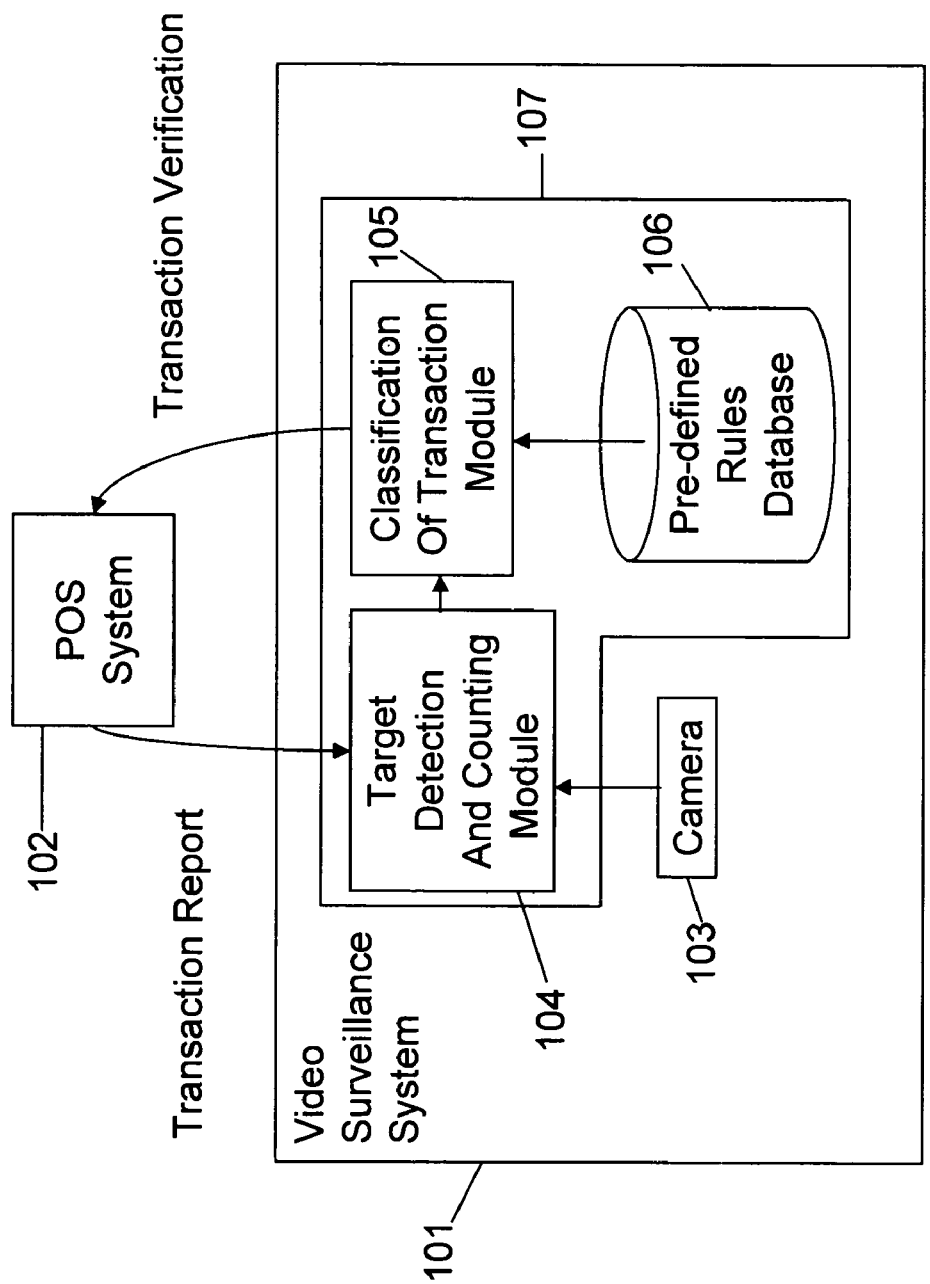
FIG. 1 illustrates an exemplary video surveillance system according to an exemplary embodiment of the invention.

In describing the invention, the following definitions are applicable throughout (including above).

"Video" may refer to motion pictures represented in analog and/or digital form. Examples of video may include: television; a movie; an image sequence from a video camera or other observer; an image sequence from a live feed; a computer-generated image sequence; an image sequence from a computer graphics engine; an image sequences from a storage device, such as a computer-readable medium, a digital video disk (DVD), or a high-definition disk (HDD); an image sequence from an IEEE 1394-based interface; an image sequence from a video digitizer; or an image sequence from a network.

A "video sequence" may refer to some or all of a video.

A "video camera" may refer to an apparatus for visual recording. Examples of a video camera may include one or more of the following: a video imager and lens apparatus; a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan, tilt, zoom (PTZ) camera; and a video sensing device. A video camera may be positioned to perform surveillance of an area of interest.

"Video processing" may refer to any manipulation and/or analysis of video, including, for example, compression, editing, surveillance, and/or verification.

A "frame" may refer to a particular image or other discrete unit within a video.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC); an optical computer; a quantum computer; a biological computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; interpreted code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

DETAILED DESCRIPTION OF EXEMPLARY EMBODIMENTS

In describing the exemplary embodiments of the present invention illustrated in the drawings, specific terminology is employed for the sake of clarity. However, the invention is not intended to be limited to the specific terminology so selected. It is to be understood that each specific element includes all technical equivalents that operate in a similar manner to accomplish a similar purpose. Each reference cited herein is incorporated by reference.

The invention relates to a video surveillance system that may be configured to detect and track individual targets of approximately the same size in video streams and to a video verification system that may be configured to verify the occurrences being monitored. The system may be adapted to disambiguate multiple objects even when they interact in tight groups and to detect moving objects in the presence of other inanimate objects, such as moving shopping carts, strollers, moving furniture, and other items.

The invention may be used in a variety of applications. In a residential or commercial setting, the invention may be used to detect humans and reduce false alarms in a residential or commercial monitoring system. In a commercial setting, the invention may be used to determine building occupancy or utilization by counting individuals entering and leaving an area and/or to detect if "piggybacking" occurred (e.g., to detect an access control violation when two or more people enter or exit through a portal when only one may be authorized to do so). For physical security, the invention may be used to detect people moving the "wrong way" in a one way corridor, such as, for example, an airport exit or public transport escalator. For public safety, the invention may be used to detect people interacting in a dangerous way, such as, for example, a person involved in a mugging or a drug dealing. In a retail setting, the invention may be used to detect store occupancy, detect queue length at a checkout lane, or verify a point of sale (POS) transaction. In a public transportation setting, the invention may be used to count people entering a public transportation facility or a vehicle and to perform video surveillance of a ticket reader to ensure that there is a ticket scanned when a person enters an area (e.g., to prevent a person from jumping over a turnstile, or overcoming another such obstacle).

The invention may be embodied in a "smart sensor" implementation. For example, the sensor may be attached to a door control system that may open automatic doors; prevent swinging doors from hitting people; or determine the difference between a person moving past a door and a person intending to go through the door. Further, the sensor may be a part of an occupancy "sensor" rather than a video camera that may detect an area occupancy in a binary mode, e.g., whether someone is present in the monitored area, and may provide an object count, e.g., how many people are present in the monitored area. The sensor may be coupled to a lighting control system, or a heating, ventilating and air-conditioning (HVAC) control system, or may provide data for a business intelligence system such as, for example, a real-estate utilization planning.

In an exemplary embodiment, the invention may be used to verify the legitimacy of several classes of retail point of sale (POS) transactions. For example, a "merchandise return" transaction may require that a customer be physically present. As another example, a "manager override" transaction may require that a manager assist the cashier. The video surveillance system of the invention may monitor the locations and number of individuals around the point of sale (POS) console (e.g., the cash register) and determine if an appropriate configuration of people is present at the time of a particular transaction. As another example, the invention may be used to count people with a predetermined goal such as, for example, to determine occupancy. As another example, the invention may be used to detect piggybacking (e.g., when two or more people enter an area, but only one card swipe at the card reader is made).

Figure 2:
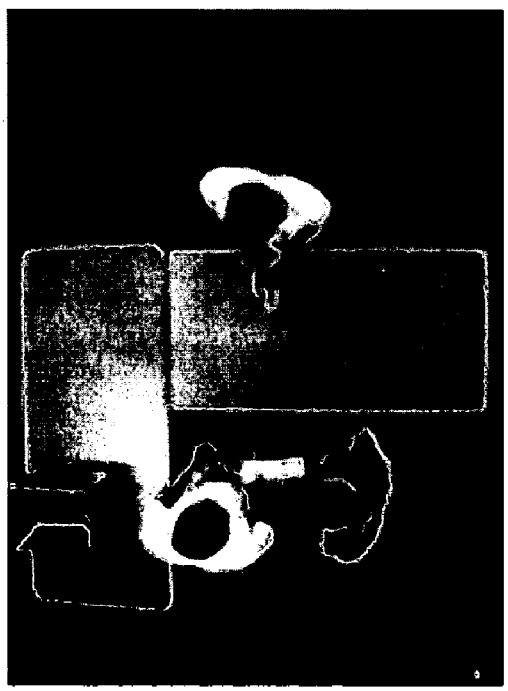
FIG. 2 illustrates an exemplary frame from a video stream from the video surveillance system according to an exemplary embodiment of the invention.

In FIGS. 1 and 2, the invention is illustrated for use in an exemplary retail environment which includes a point of sale (POS) transaction verification application. FIG. 1 illustrates a video surveillance system 101 according to this exemplary embodiment of the invention. For an exemplary point of sale (POS) setting, the video surveillance system 101 of the invention may interact with a point of sale (POS) system 102. The video surveillance system 101 may include a video camera 103, a target (e.g., human) detection and counting module 104, a classification of transaction (valid/invalid) module 105, and a pre-defined rules database 106.

The video camera 103 may overlook a console (not shown) of the point of sale (POS) system 102 from an overhead position. A field of view of the video camera 103 may be looking down on the scene. The target detection and counting module 104 may receive input from the point of sale (POS) system 102 as a transaction report that a particular transaction is requested, underway, or has been completed. The target detection and counting module 104 may determine the number of humans, if any, in the video scene. An exemplary embodiment of the target detection and counting module 104 is discussed below with respect to FIGS. 6-18. The classification of transaction module 105 may determine the constellation of participants based on the rules received from the pre-defined rules database 106. The system 101 may provide a transaction verification message to the point of sale (POS) system 102 (or some other data monitoring or archiving system) to indicate whether the transaction was legitimate or not.

Blocks 105 and 106 may be implemented using the techniques discussed in, for example, U.S. Published Patent Application No. 20050146605, U.S. Published Patent Application No. 20050162515, or U.S. Published Patent Application No. 20050169367, identified above. In these documents, the creation of rules and the performance of activity inference (e.g., people counting) are discussed. For this invention, for example, human target primitives, as discussed in, for example, U.S. Published Patent Application No. 20050146605, identified above, may be used.

For an example of a point of sale (POS) system, a primitive called a "POS transaction primitive" may be used. This primitive may include data items such as (1) the time of a point of sale (POS) transaction; (2) the location of the transaction, e.g., at which point of sale (POS) terminal transaction is taking place; and (3) the type of transaction, e.g., sale, return, manager override, and the like. Additional POS primitive data may include, for example, the transaction value, the employee identification and/or name, and/or the items of the transaction.

Some exemplary rules for the rules database 106 may be used with the POS transaction primitive. For example, a return transaction primitive may determine when a return is being processed, even if the return is accompanied by purchases within the same transaction. For example, a "return transaction verification" rule using the return transaction primitive may be the following:

if a point of sale (POS) return transaction (primitive) is registered and there has been no customer present (no human in a "customer" area of interest) for a [parameter] period of time; or there has been no cashier present (no human present in an "employee" area of interest) for a [parameter] period of time;

then the transaction is invalid and an alarm condition is generated.

As another example, a "manager override" transaction rule may be the following:

if a POS manager override transaction (primitive) is registered; and there have not been two employees present (less than two humans in an "employee" area of interest) for a [parameter] period of time;

then the transaction is invalid and an alarm condition is generated.

As another example, a "refund with manager" transaction rule may be the following:

if a POS return transaction primitive is registered with a refund amount over a [parameter] value; and there have not been two employees present (less than two humans in an "employee" area of interest) for a [parameter] period of time;

then the transaction is invalid and an alarm condition is generated.

As another example, super rules may be created based on previously-defined rules. A super rule may look for repetitive patterns. Examples of a super rule may include the following:

if a given employee has a [parameter] number of suspicious transactions within a [parameter] period of time, an alarm condition is generated;

if a given employee has suspicious transactions totaling at least [parameter] value within [parameter] period of time, an alarm condition is generated; or if a store has a [parameter] number of suspicious transactions within a [parameter] period of time, an alarm condition is generated.

The video camera 103 may be connected to a computer system 107 that may perform analysis of the video stream from the video camera 103 to determine the locations and number of people in the area of interest. The computer system 107 may be a standalone system or embedded in the video camera 103, a digital video recorder (DVR), a network video recorder (NVR), a network switcher, a network router, the point of sale (POS) system 102, the access control system as described below, or any other hardware device or system. The computer system 107 may include the target detection and counting module 104, the classification of transaction module 105, and the pre-defined rules database 106. The target detection and counting module 104, the classification of transaction module 105, and the pre-defined rules database 106 may be implemented as a computer-readable medium including software to perform the operations of the target detection and counting and classification of transaction modules 104, 105 and interact with the database 106, such that when the software is executed by a computer system, the computer system may be caused to perform the operations of the target detection and counting and classification of transaction modules 104, 105. Alternatively, the target detection and counting module 104, the classification of transaction module 105, and the pre-defined rules database 106 may be implemented with application-specific hardware to emulate a computer and/or software.

FIG. 2 illustrates an exemplary frame from a video stream from the video surveillance system according to an exemplary embodiment of the invention. The exemplary camera view may be from the video camera positioned overhead. In the exemplary frame, a customer is shown on the right, and two employees, such as, for example, a cashier and a manager, are shown on the left.

Figure 17:
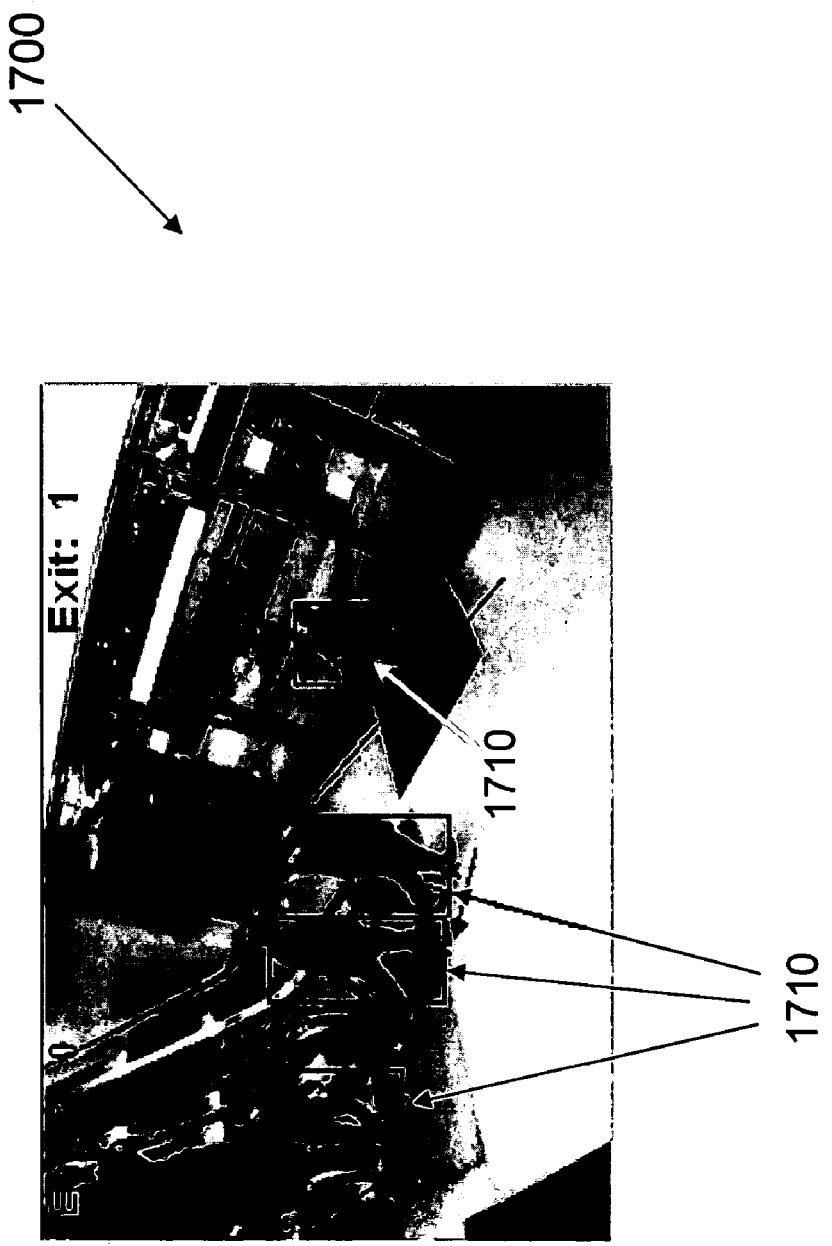
FIG. 17 illustrates an exemplary frame from a video stream from the video surveillance system according to an exemplary embodiment of the invention.

FIG. 17 illustrates an exemplary frame 1700 from a video stream from the video surveillance system 101 according to another exemplary embodiment of the invention. The exemplary camera view may be from the video camera 103 looking towards the area of interest, instead of down on the scene as in FIG. 2. The exemplary frame 1700 of FIG. 17 may be used in a video surveillance system for a person counting application. For example, four targets 1710 may be counted in the frame 1700.

Figure 18:
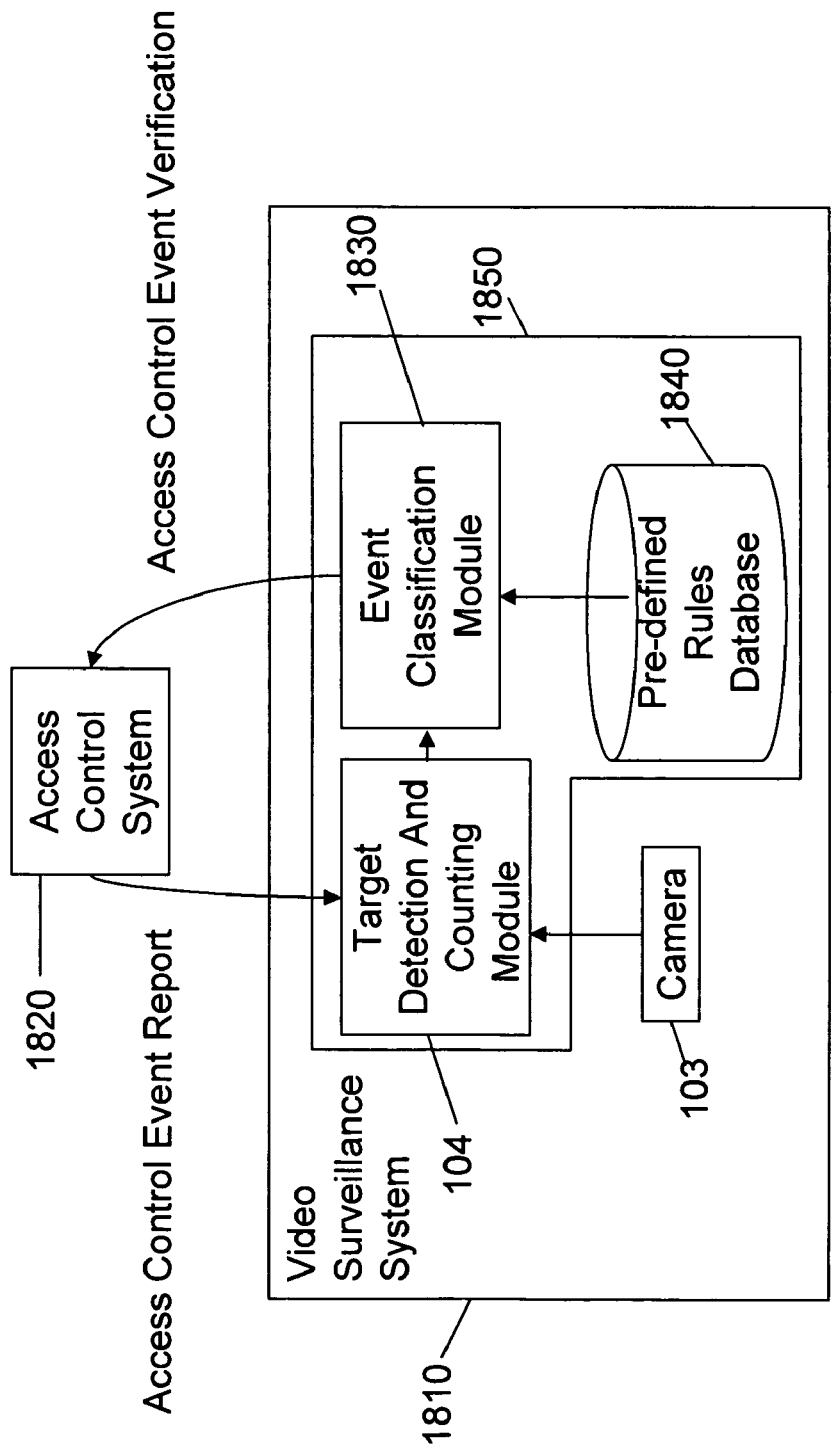
FIG. 18 illustrates an exemplary video surveillance system for access control according to an exemplary embodiment of the invention.

With reference to FIG. 18, in another exemplary embodiment, the invention may be used in an access control setting. In an access control setting, control to an area may be restricted and may be under the video surveillance. FIG. 18 illustrates a video surveillance system 1810 according to this exemplary embodiment of the invention. For an exemplary access control setting, the video surveillance system 1810 of the invention may interact with an access control system 1820 which may include, for example, a card reader to accept keycards and/or a keypad to accept passwords. The video surveillance system 1810 may include the video camera 103, for example, positioned overhead as illustrated in FIG. 2 or towards an area of interest as illustrated in FIG. 17, the target detection and counting module 104, an event classification (valid/invalid) module 1830, and a pre-defined rules database 1840.

The video camera 103 may be connected to a computer system 1850 that may perform analysis of the video stream from the video camera 103 to determine the locations and number of people in the area of interest. The computer system 1850 may be a standalone system or embedded in the video camera 103, a digital video recorder (DVR), a network video recorder (NVR), a network switcher, a network router, the point of sale (POS) system 102, the access control system 1820, or any other hardware device or system. The computer system 1850 may include the target detection and counting module 104, the event classification module 1830, and the pre-defined rules database 1840. The event classification module 1830 and pre-defined rules database 1840 may be implemented similar to the classification of transaction module 105 and pre-defined rules database 106 as described in relation to FIG. 1, except the event classification module 1830 and pre-defined rules database 1840 are directed to interacting with the access control system 1820. The target detection and counting module 104, the event classification module 1830, and the pre-defined rules database 1840 may be implemented as a computer-readable medium including software to perform the operations of the target detection and counting module and the event classification modules 104, 1830 and interact with the pre-defined rules database 1840, such that when the software is executed by a computer system, the computer system may be caused to perform the operations of the target detection and counting module and the event classification modules 104, 1830. Alternatively, the target detection and counting module 104, the event classification module 1830, and the pre-defined rules database 1840 may be implemented with application-specific hardware to emulate a computer and/or software.

A video surveillance system similar to FIG. 18 may be used for a person counting application exemplary embodiment, as illustrated in FIG. 17. The access control system 1820 and an interaction of the access control system 1820 with the video surveillance system 1810 may be optional.

In the exemplary embodiments of FIGS. 1 and 2, the invention is illustrated for use in retail with a POS transaction verification application. In the example of FIG. 17, the invention is illustrated for use in a person counting application. In FIG. 18, the invention is illustrated in an access control application integrated with a card reader system. As described in a greater detail below, the invention may be used for occupancy detection and estimation, or in a queue length estimation application. However, it is understood that the invention may be applied to any appropriate application as those skilled in the art will recognize.

Figure 3:
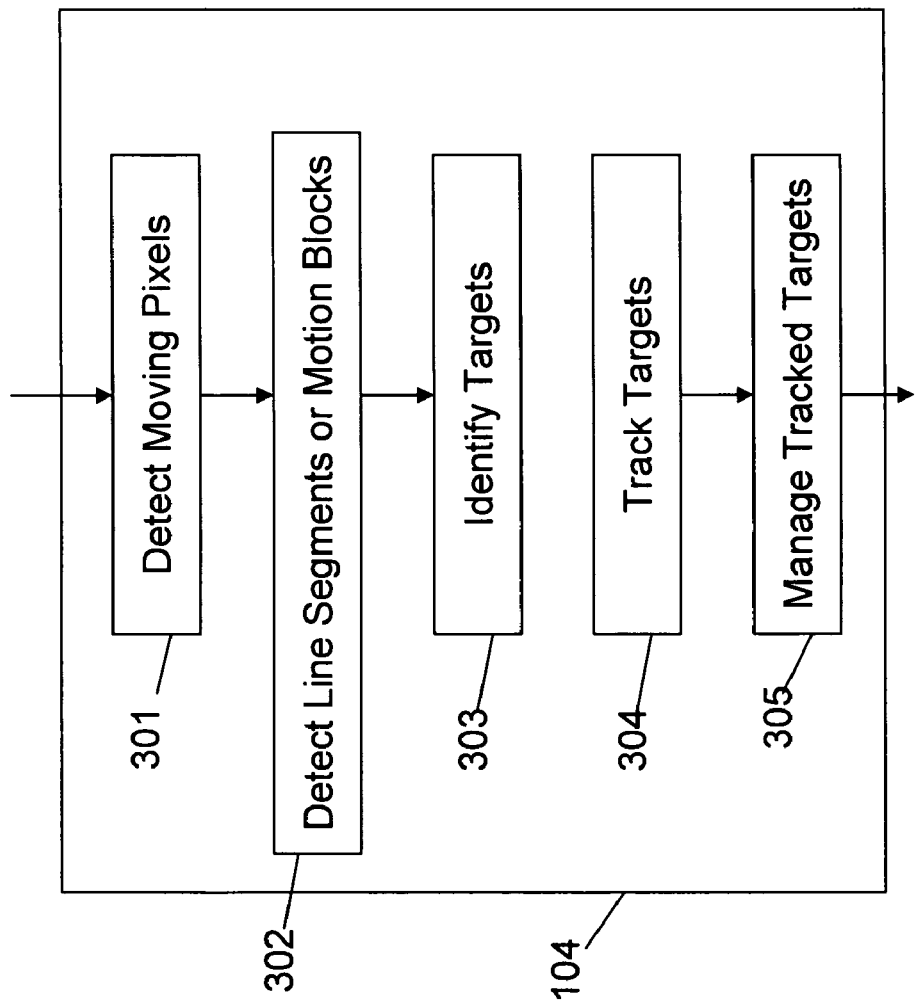
FIG. 3 illustrates an exemplary flow diagram for target detection and counting according to an exemplary embodiment of the invention.

FIG. 3 illustrates an exemplary flow diagram for an exemplary implementation of the target detection and counting module 104 according to an exemplary embodiment of the invention. For example, targets may be described using co-moving sets of line segments or motion blocks extracted from the video scene. To extract the sets of line segments or motion blocks, blocks 301 and 302 may be employed. In block 301, moving pixels may be detected in the video stream using, for example, three-frame differencing, or some other technique as described, for example, in U.S. Pat. No. 6,625,310, or U.S. Pat. No. 6,999,600, identified above. A motion mask may be extracted. An exemplary embodiment of block 301 is discussed below with respect to FIG. 4. In block 302, line segments or motion blocks may be detected using, for example, edge detection and line growing technique described, for example, in U.S. Published Patent Application No. 20060239506, identified above. An exemplary embodiment of block 302 is discussed below with respect to FIGS. 5-7. In block 303, targets may be identified as sets of line segments that fit the requirements of a normal or pre-defined target (e.g., approximate target shape and size), given the field of view of the video camera 103. In block 304, targets may be tracked using a tracking filter, such as a Kalman filter, applied to the centroids of the targets, or some other technique as described, for example, in U.S. Published Patent Application No. 20050146605, or U.S. Published Patent Application No. 20060268111, identified above. An exemplary embodiment of block 304 is discussed below with respect to FIGS. 8-16. In block 305, the tracked targets may be managed.

Figure 4:
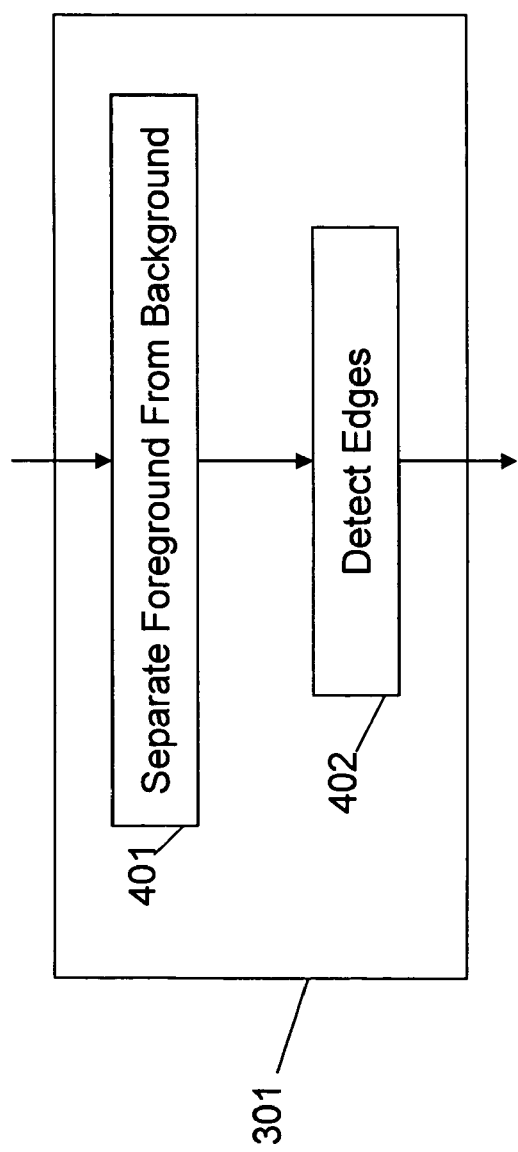
FIG. 4 illustrates an exemplary flow diagram for detecting moving pixels according to an exemplary embodiment of the invention.

FIG. 4 illustrates an exemplary flow diagram for detecting moving pixels in block 301 of FIG. 3 according to an exemplary embodiment of the invention. In block 401, the foreground moving area may be separated from the background scene. The separation may be performed using change detection as known in the art. The output of the change detection may be a foreground mask for each frame. In block 402, the edges of each foreground mask may be detected. An edge pixel map may be obtained. While other edge detection algorithms may be used, an exemplary embodiment of the invention may use the Canny edge detection, which produces single-pixel-width edges. The edge detection may be performed only on the foreground area, which may require some modifications to the Canny edge detection to incorporate the foreground mask information.

Figure 5:
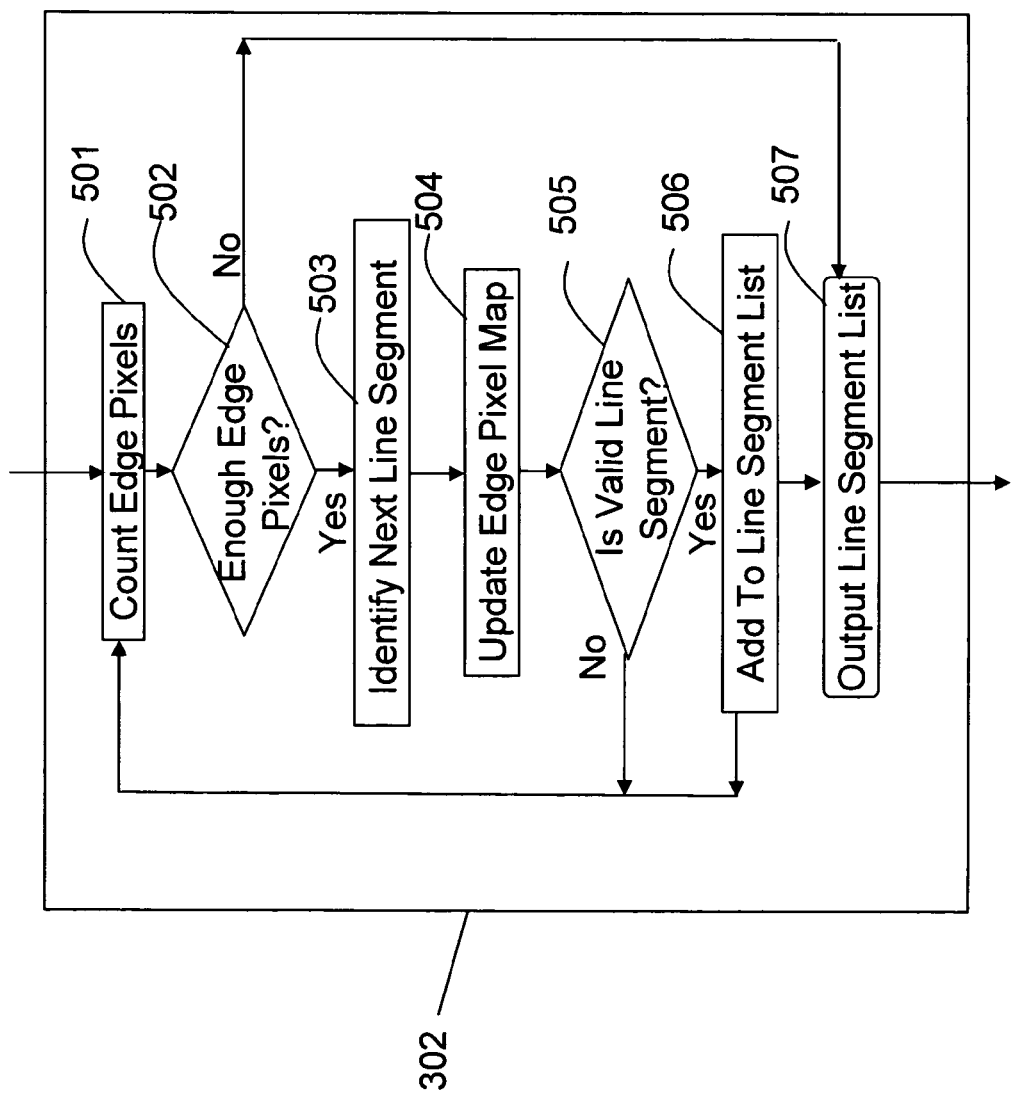
FIG. 5 illustrates an exemplary flow diagram for detecting line segments according to an exemplary embodiment of the invention.

FIG. 5 illustrates an exemplary flow diagram for detecting line segments in block 302 of FIG. 3 according to an exemplary embodiment of the invention. According to an exemplary embodiment, a deterministic method may be used to detect line segments by extracting all of the line segments from the edge pixel map. The method may iteratively search the edge pixel map to find a new line segment until there are not enough unused edge pixels remaining. Each edge pixel may only be in one line segment, and after being used, the edge pixel may be removed from the edge pixel map.

An input to block 501 may be the edge pixel map of the frame obtained from, for example, block 402 of FIG. 4. In block 501, edge pixels may be counted. In block 502, a determination may be made whether a sufficient number of edge pixels exists (or remains) to identify a line segment. A minimum line segment length or first threshold to check this condition may be determined by user input parameters on the rough image size of an exemplary object, such as, for example, a shopping cart. For example, if the rough image width of a shopping cart is sixty pixels, the first threshold may be, for example, set as one third of it, that is, twenty pixels. If a sufficient number of edge pixels does not exist (or remain), flow may proceed to block 507; otherwise, flow may proceed to block 503. In block 503, a new line segment may be identified. An exemplary embodiment of block 503 is discussed below with respect to FIG. 6. In block 504, the edge pixel map may be updated to eliminate the pixels used in block 503, as noted above. In block 505, a determination may be made whether the new line segment is valid based on, for example, its length and linearity. For example, if the identified new line segment has length much shorter than the image dimension of an expected shopping cart or if its overall linearity is too low, the new line segment may be considered to be an invalid line segment. If the identified new line segment is not valid, the invalid line segment may be discarded, and flow may proceed to block 501; otherwise, flow proceeds to block 506. In block 506, the valid line segment may be added to a list of line segments in the frame. In block 507, the list of valid line segments may be outputted.

Figure 6:
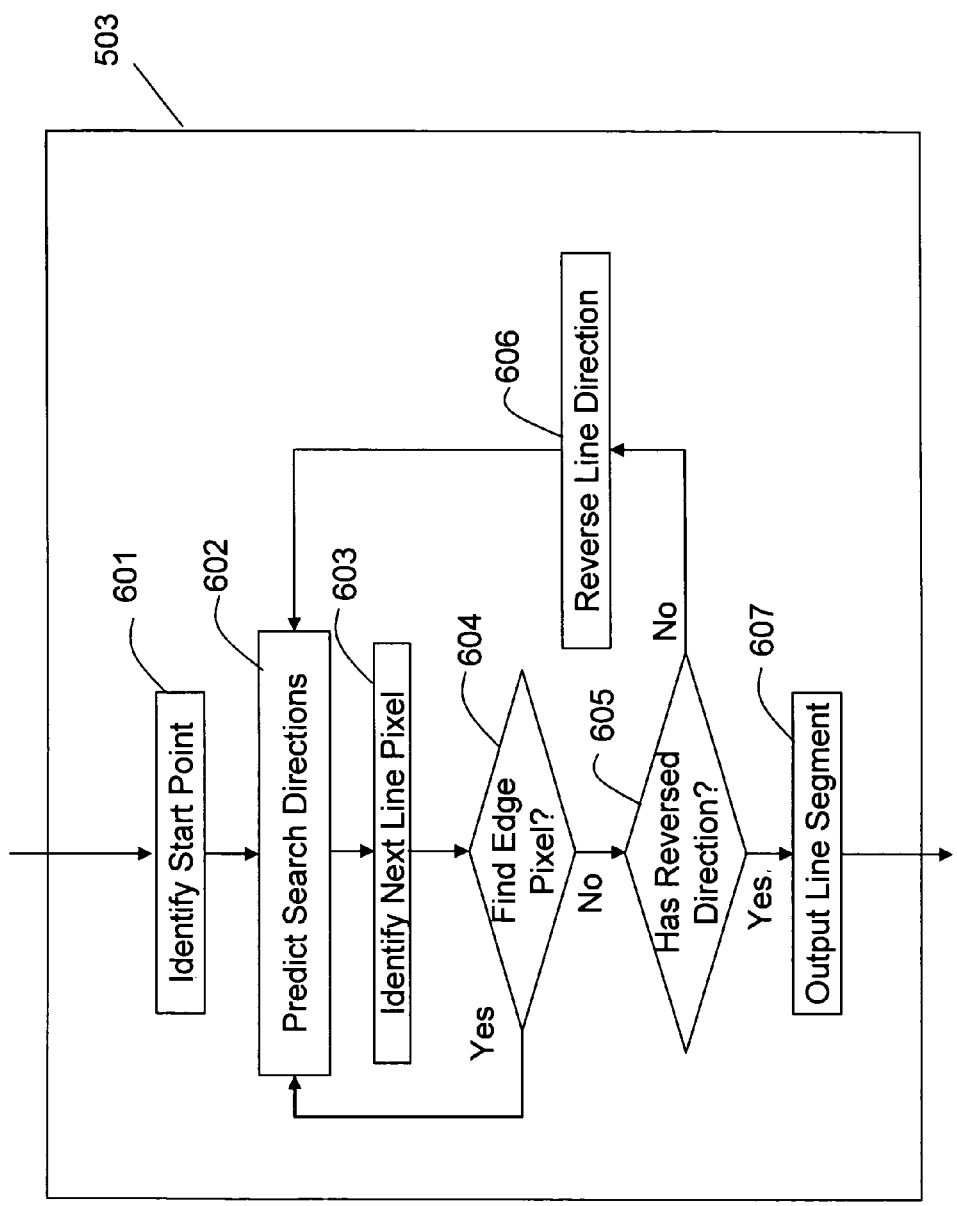
FIG. 6 illustrates an exemplary flow diagram for finding a next line segment according to an exemplary embodiment of the invention.

FIG. 6 illustrates an exemplary flow diagram for finding a next line segment in block 503 of FIG. 5 according to an exemplary embodiment of the invention. In block 601, a starting point of the new line segment is identified from a given edge pixel map. To identify a first line segment, a start point may be obtained by scanning the entire edge pixel map from top left corner until a first unused edge point is located. To identify the subsequent line segments, the search may be speeded up by using the start point of the preceding line segment as the scanning start position. In block 602, next search directions may be predicted for an end point based on an estimated line direction. An exemplary embodiment of block 602 is discussed below with respect to FIG. 7. In block 603, the next line pixel may be identified by looping through each predicted search position to determine if the pixel is an edge pixel. In block 604, if the next line pixel is an edge pixel, the pixel may be added to the line segment as a new end point. Flow may proceed to block 602. Otherwise, the next line pixel may be searched for in both directions, and flow may proceed to block 605. In block 605, if the next line pixel can not be found in one direction, the reverse direction may have already been searched. If the reverse direction has not been searched, flow may proceed to block 606; otherwise, flow may proceed to block 607. In block 606, the search process may reverse the line direction. The end point may become the start point, the start point may become the current end point, and flow proceeds back to block 602. In block 607, the end of the search process on the current line segment may be reached, and the line segment may be outputted.

Figure 7:
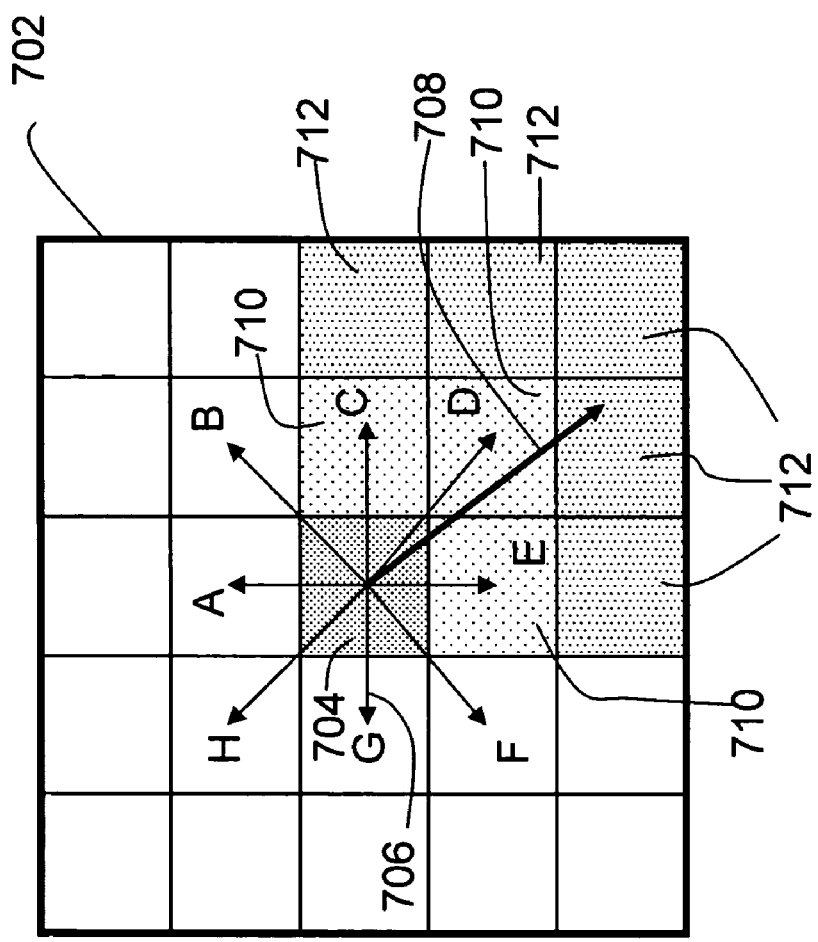
FIG. 7 illustrates predicting new search directions according to an exemplary embodiment of the invention.

FIG. 7 illustrates predicting new search directions in block 602 of FIG. 6 according to an exemplary embodiment of the invention. Area 702 may depict a region of an image, where each block indicates one pixel location. Area 704 may indicate the current end point pixel of the current line segment. Three different states may be considered when predicting the next search positions. In a first state (the initial pixel), the current end point pixel 704 may also be the start point. Eight neighboring directions A-H of the end point pixel 704 may be searched as indicated by a reference numeral 706.

In a second state, once multiple pixels in a line segment are determined, the direction of the line segment may be estimated using information provided by the pixels of the line segment. For example, clustering of the line segment pixels into two groups may be performed. E.g., the starting pixels and the ending pixels, which may correspond to the first half and second half of the line segment, may be clustered into two groups. The line direction may be determined by using the average locations of the two groups of pixels.

In a third state, when a current line direction is available, for example, as may be indicated by arrow 708, top three directions may be selected for search, for example, C, D, and E, pointing to pixels 710, that have minimum angle distances from the line direction 708. Two further scenarios may be considered in this case. First, the line may not yet be long enough to become a consistent line segment, e.g., it is unclear whether the list of pixels is a part of a line segment or a cluster of neighboring edge pixels. In one embodiment, to determine if the current line segment is a substantially consistent line segment, the minimum line segment length or first threshold may be used. In particular, if the line segment is less than the first threshold, the line segment may be considered not to be substantially consistent. To avoid extracting a false line segment, the three direct neighboring pixel locations 710 may be included as the next search locations. Second, the line segment may be long enough, for example, a portion of the line may be missing due to an occasional small gap in the edge map caused by noise. Thus, further neighborhood search locations 712 may be included in the search.

Figure 8:
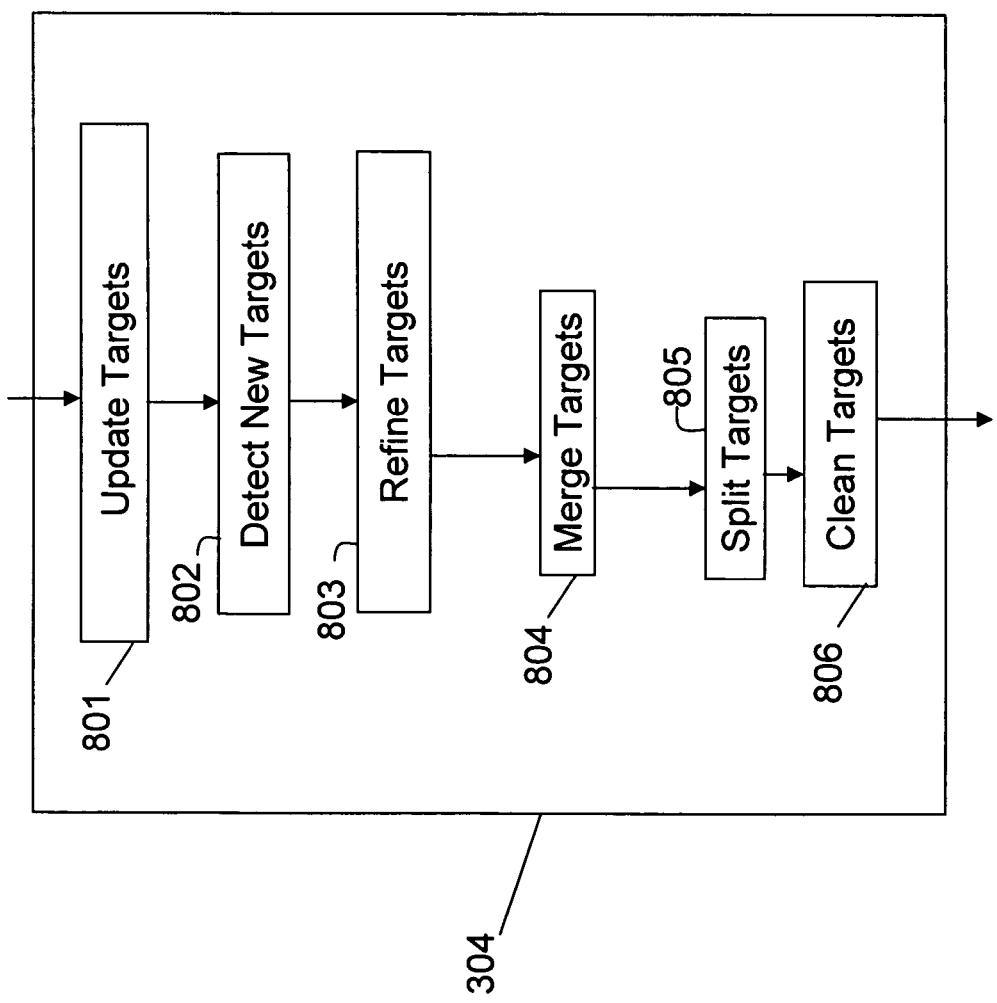
FIG. 8 illustrates an exemplary flow diagram for tracking targets according to an exemplary embodiment of the invention.

FIG. 8 illustrates an exemplary flow diagram for tracking the identified targets in block 304 of FIG. 3 according to an exemplary embodiment of the invention. In block 801, existing targets may be updated as new information is received from each frame. An exemplary embodiment of block 801 is discussed below with respect to FIG. 9. In block 802, new targets may be recognized from any unassigned line segments that have not been identified as a part of an existing target. An exemplary embodiment of block 802 is discussed below with respect to FIG. 10. In block 803, the targets may be refined to ensure that the available features may be accommodated. An exemplary embodiment of block 803 is discussed below with respect to FIG. 11. In block 804, the targets may be analyzed to determine if the targets should be merged (i.e., two targets become one target). In block 805, the targets may be analyzed to determine if the targets should be split (i.e., one target becomes two targets). Exemplary embodiments of the blocks 804 and 805 are discussed below with respect to FIGS. 12-15. In block 806, the targets may be cleaned, which may be used to determine when a target has left the field of view of the video camera. An exemplary embodiment of block 806 is discussed below with respect to FIG. 16.

Figure 9:
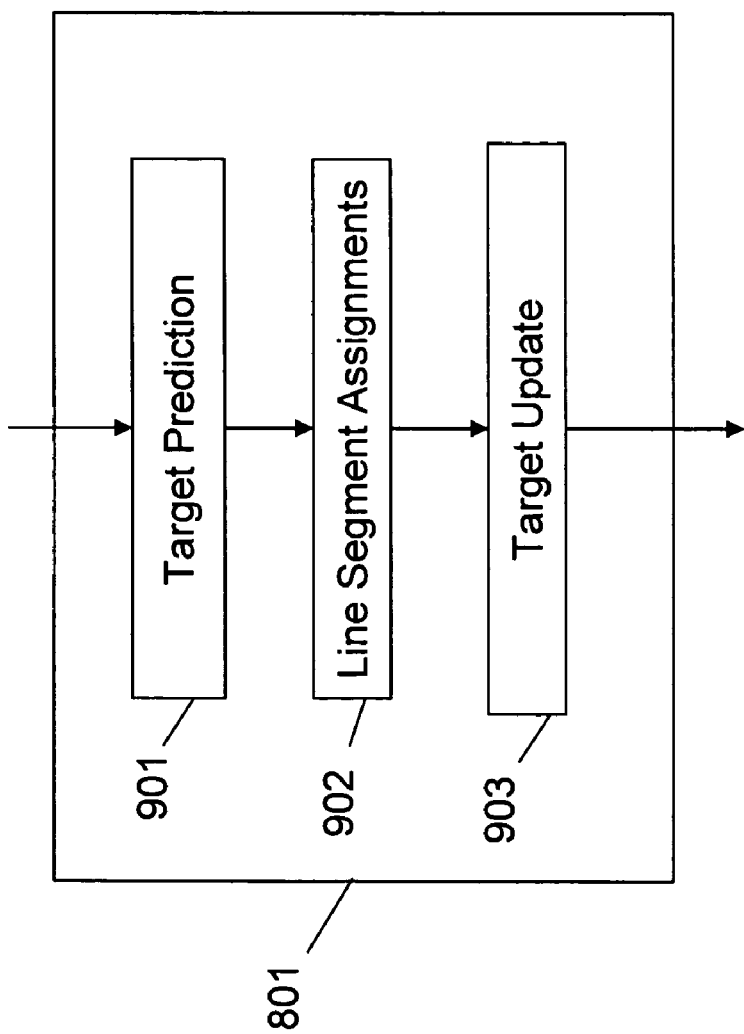
FIG. 9 illustrates an exemplary flow diagram for updating targets according to an exemplary embodiment of the invention.

FIG. 9 illustrates an exemplary flow diagram for updating the identified targets in block 801 of FIG. 8 according to an exemplary embodiment of the invention. In block 901, the parameters (e.g., position and size, or position, size, and velocity) of existing targets may be predicted using an appropriate tracking filter, such as, for example, a Kalman filter or other tracking filtering algorithm, described in, for example, U.S. Published Patent Application No. 20050146605, or U.S. Published Patent Application No. 20060268111, identified above. In block 902, the line segments that have been detected may be assigned to each of the targets based on their locations with respect to the centroid and size of the existing target. In block 903, the targets may be updated. For example, the target's new position, size and velocity may be updated according to the tracking filter update rules.

Figure 10:
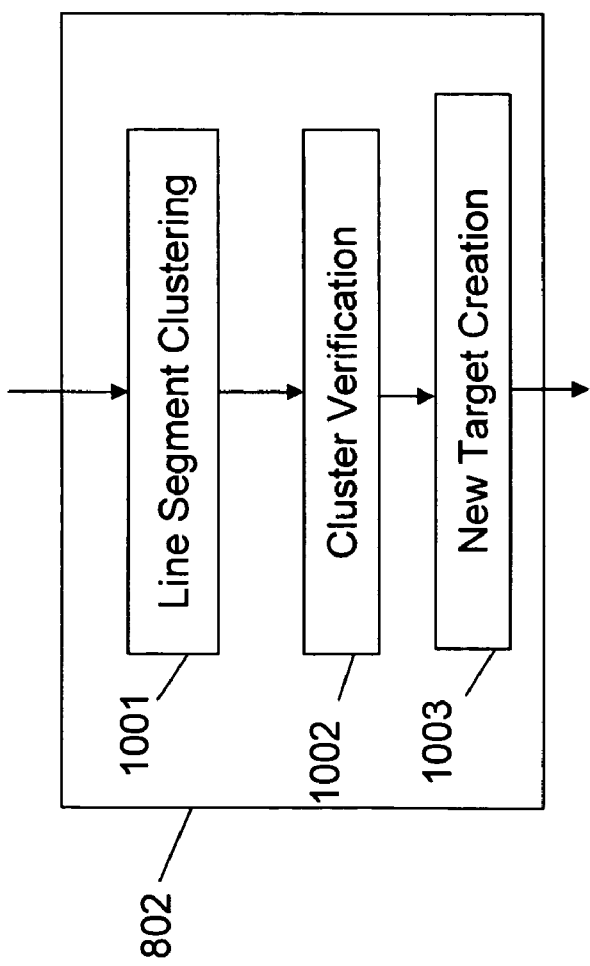
FIG. 10 illustrates an exemplary flow diagram for detecting new targets according to an exemplary embodiment of the invention.

FIG. 10 illustrates an exemplary flow diagram for detecting new targets in block 802 of FIG. 8 according to an exemplary embodiment of the invention. In block 1001, unassigned line segments may be clustered using, for example, a neighborhood grouping method. For example, the line segments within a certain distance threshold from each other may be clustered into a single group. In block 1002, the cluster of the unassigned line segments may be verified to ensure the unassigned line segments correspond to a pre-defined model, e.g., pre-defined requirements of a target. For example, if a human target in the field of view of FIG. 2 is used to define the requirements of a target, the cluster of the unassigned line segments may need to have a correct approximate size to indicate the presence of a human target. If the cluster of the unassigned line segments does not fit the pre-defined requirements, e.g., too large or too small, the cluster of the unassigned line segments may be rejected. In block 1003, if the cluster of the unassigned line segments fits the requirements of a target definition from block 1002, the cluster of unassigned line segments may be designated as a new target, and a tracking filter may be instantiated for the new target with the position and size of the cluster of unassigned line segments as the initial parameters for the new target.

Figure 11:
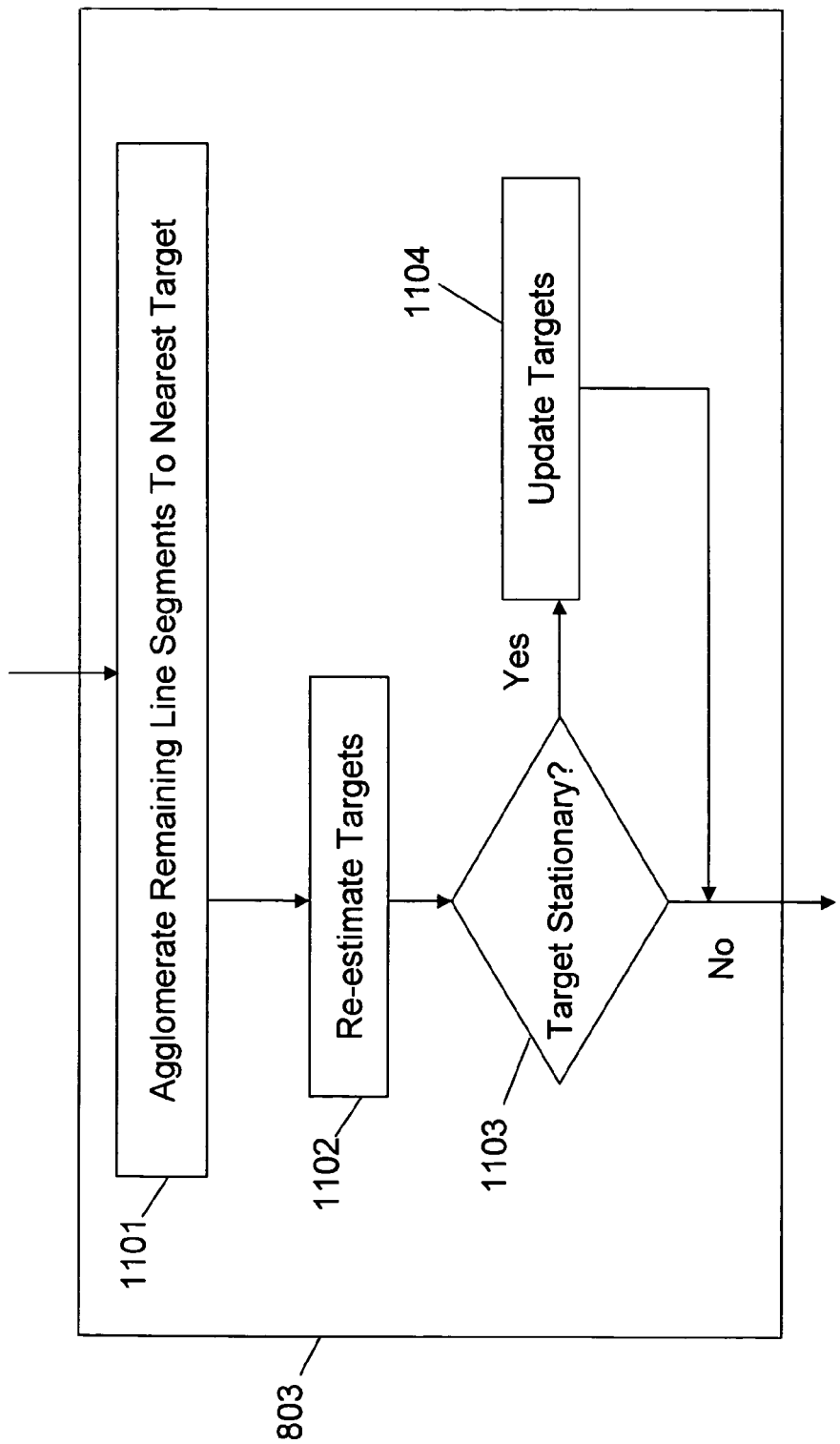
FIG. 11 illustrates an exemplary flow diagram for refining targets according to an exemplary embodiment of the invention.

FIG. 11 illustrates an exemplary flow diagram for refining targets in block 803 of FIG. 8 according to an exemplary embodiment of the invention. In block 1101, any remaining unassigned line segments that have not been assigned to existing or new targets may be agglomerated into a nearest neighbor target. In block 1102, the targets may be re-estimated based on the new features. For example, the position and velocity of the targets may be re-calculated, and the associated tracking filter may be updated with the new parameters. In block 1103, a determination may be made whether each target is becoming stationary (i.e., stops moving). If the number and size of line segments associated with the target decreases, the target may be ceasing motion. If the target is determined to becoming stationary, flow may proceed to block 1104; otherwise, flow may exit from block 803. In block 1104, the target's parameters (e.g., size, position, and velocity) may be updated using all (or some) of the moving pixels in the target's vicinity rather than just the moving line segments.

Figure 12:
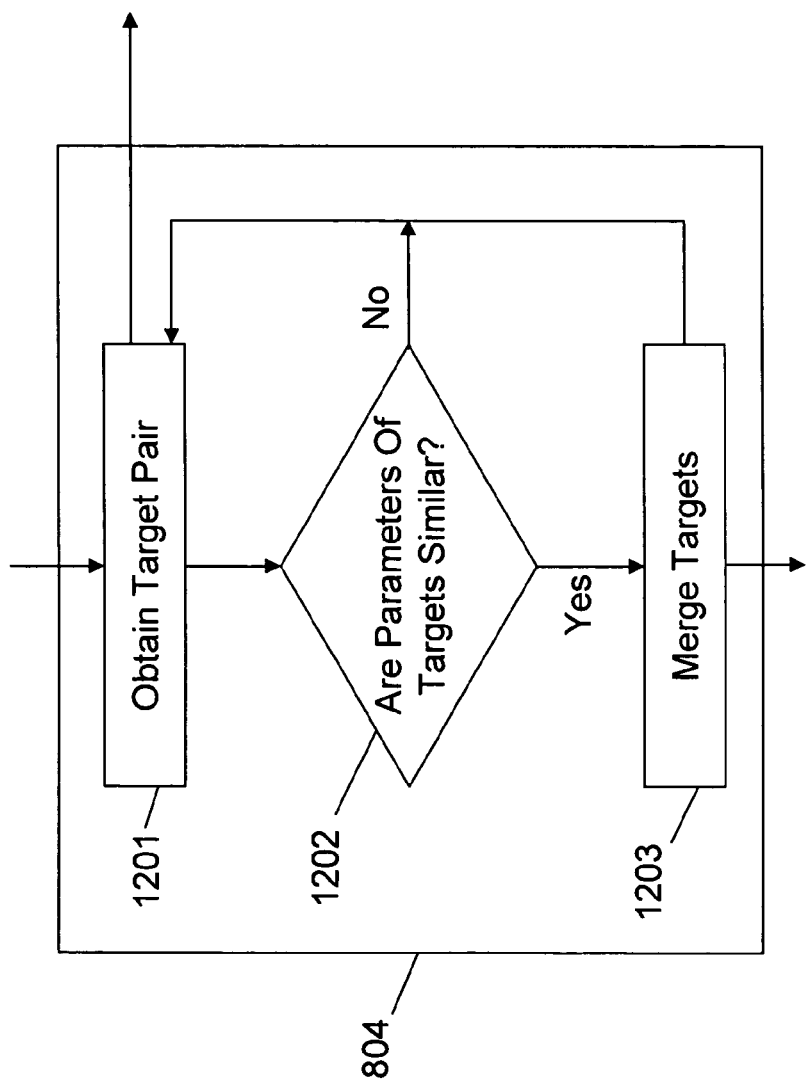
FIG. 12 illustrates an exemplary flow diagram for merging targets according to an exemplary embodiment of the invention.

FIG. 12 illustrates an exemplary flow diagram for merging targets in block 804 of FIG. 8 according to an exemplary embodiment of the invention. In block 1201, two targets may be obtained. In block 1202, the parameters of the obtained targets may be compared. For example, the size and history (or age) of the targets may be compared. If the two targets occupy similar space, one is smaller than the other, and one is younger than the other, the two targets may be determined to be substantially similar to be merged into a single target. If the parameters of the targets are similar, flow may proceed to block 1203; otherwise, flow may proceed to block 1201. In block 1203, the two targets may be merged into a single target. For example, the smaller and/or younger target may be merged into the larger target. From block 1203, flow may proceed to block 1201. Two targets may be obtained that have not been compared previously. Flow may exit block 804 once all (or a sufficient number) of targets have been compared for merger.

Figure 13:
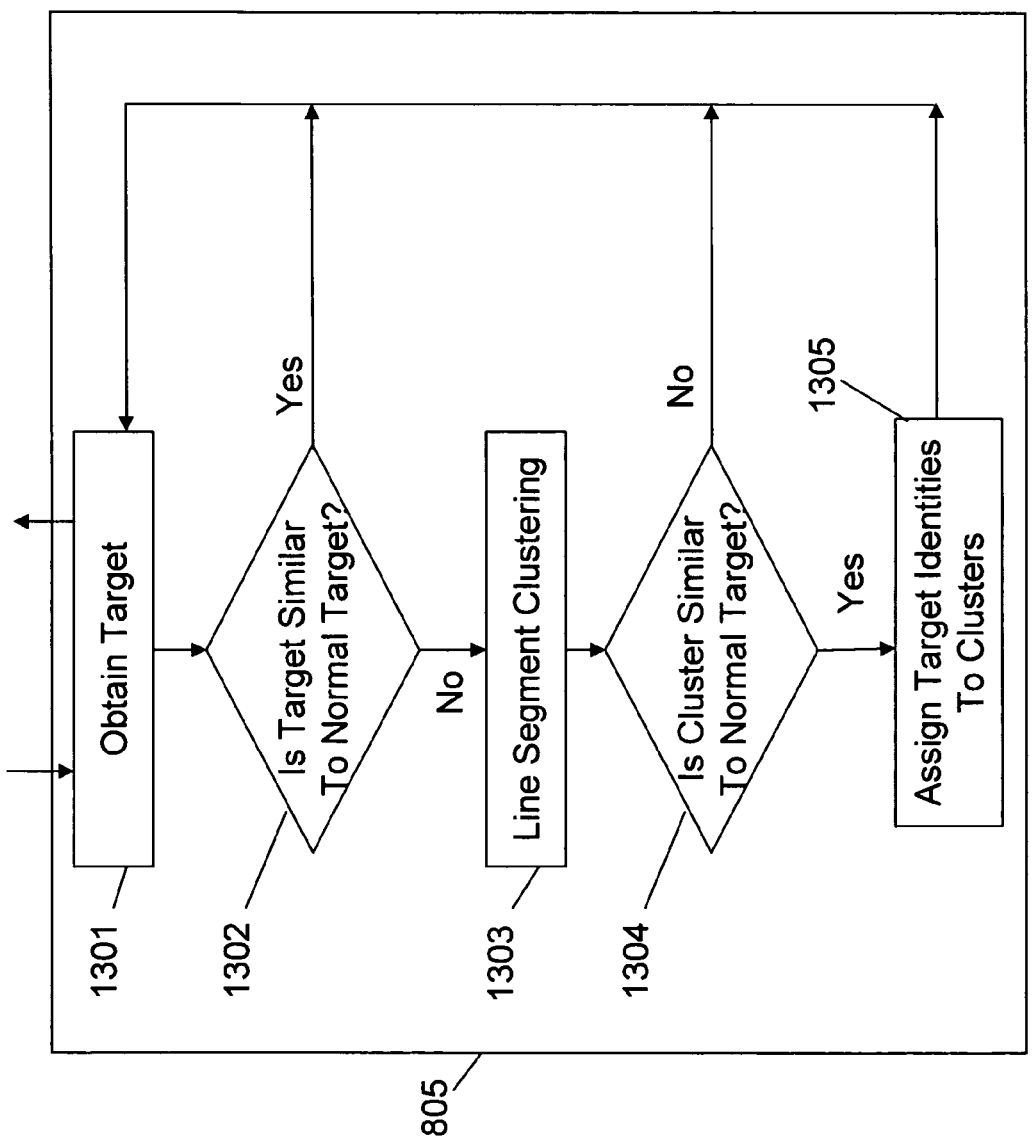
FIG. 13 illustrates an exemplary flow diagram for splitting targets according to an exemplary embodiment of the invention.

FIG. 13 illustrates an exemplary flow diagram for splitting targets in block 805 of FIG. 8 according to an exemplary embodiment of the invention. In block 1301, a target may be obtained. In block 1302, a determination may be made whether the target is similar to a normal or a pre-defined target. For example, the normal target may be modeled as a person of the embodiment of FIG. 2. If the target and normal target are compared based on, for example, their sizes, and if the target is larger than the normal target, the target may be determined not to be similar to the normal target. If the target is not similar to the normal target, flow may proceed to block 1303; otherwise, flow may proceed to block 1301. In block 1303, clusters may be obtained from the line segments of the target. For example, two line segments that are furthest away from each other within the target may be identified, and clustering may be re-initialized similarly to the clustering described above regarding block 1001 of FIG. 10 with both of the selected line segments as the starting points. The result may be two new clusters of line segments. In block 1304, a determination may be made whether the two new clusters of line segments are similar to the normal target. For example, if each resulting cluster is of appropriate size and shape as compared to the normal target, each cluster may be considered to be an individual target. If each new cluster of line segments is similar to the normal target, the flow may proceed to block 1305; otherwise, the flow may proceed to block 1301. In block 1305, target identities may be assigned to each new cluster of line segments. For example, the smaller cluster may be assigned a new identity, and a larger cluster may maintain the original identity of the target. From block 1305, flow may proceed to block 1301. Flow may exit block 805 once all (or a sufficient number) of targets have been analyzed for splitting.

As an alternative to the techniques discussed with respect to FIGS. 12 and 13, the merging and splitting of targets may be considered simultaneously and may be based on, for example, the analysis of the shape of the moving target blob. For example, with reference to FIG. 2, the analysis may result in labeling the number of the human targets in a blob as "no targets," "one target," or ">1 targets" as described in detail below. Other exemplary embodiments may count specific targets in a group.

Figure 14:
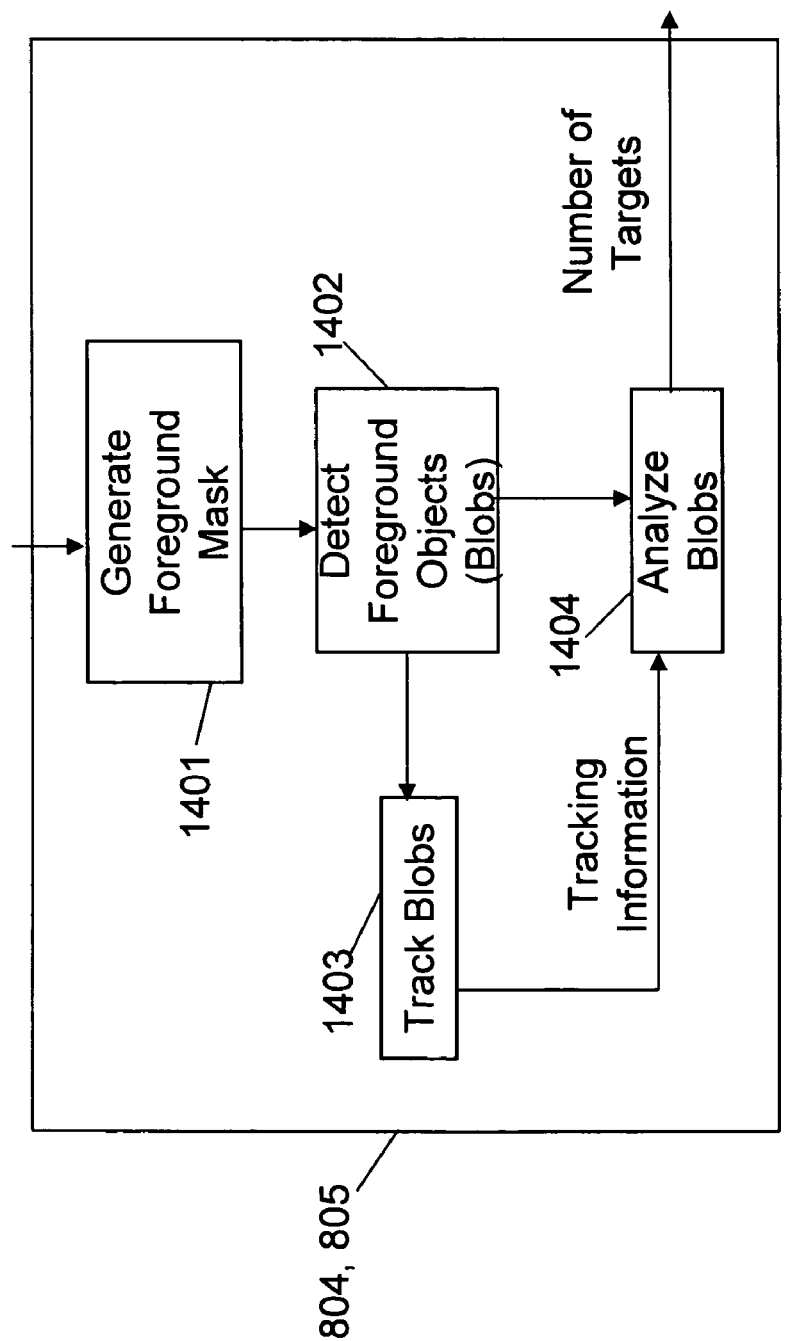
FIG. 14 illustrates an exemplary flow diagram for merging and splitting targets according to an exemplary embodiment of the invention.

FIG. 14 illustrates an exemplary flow diagram for merging and splitting targets in blocks 804, 805 of FIG. 8 according to an exemplary embodiment of the invention. In block 1401, a foreground mask may be generated for each video frame. The foreground mask may be generated using the detection of moving pixels discussed with reference to block 301 of FIG. 3 or any other foreground object detection technique as described, for example, in U.S. Pat. No. 6,625,310, U.S. Published Patent Application No. 20050146605, U.S. Patent Application No. 20050162515, or U.S. Published Patent Application No. 20050169367, identified above.

In block 1402, foreground objects (i.e., blobs) may be detected within the motion mask generated in block 1401. The foreground objects may be detected using one of the clustering algorithms described for example, in U.S. Published Patent Application No. 20050146605, U.S. Published Patent Application No. 20050162515, or U.S. Published Patent Application No. 20050169367, identified above.

Optionally, in block 1403, the blobs may be tracked via an object tracking algorithm and tracking information may be generated as described, for example, in U.S. Published Patent Application No. 20050146605, U.S. Published Patent Application No. 20050162515, U.S. Published Patent Application No. 20050169367, or U.S. Patent Published Application No. 20060268111, identified above.

From blocks 1402 and 1403, flow may proceed to block 1404. In block 1404, the blobs from block 1402 and the tracking information from block 1403 may be used to analyze the blobs, and the number of targets may be identified. For example, the blobs may be analyzed based on their size and shape. An exemplary embodiment of block 1404 is discussed below with respect to FIG. 15. The result of block 1404 may be a number of targets that is the same as the previous number of targets, fewer than the previous number of targets (i.e., a merger of previous targets), or greater than the previous number of targets (i.e., a split of previous targets).

Figure 15:
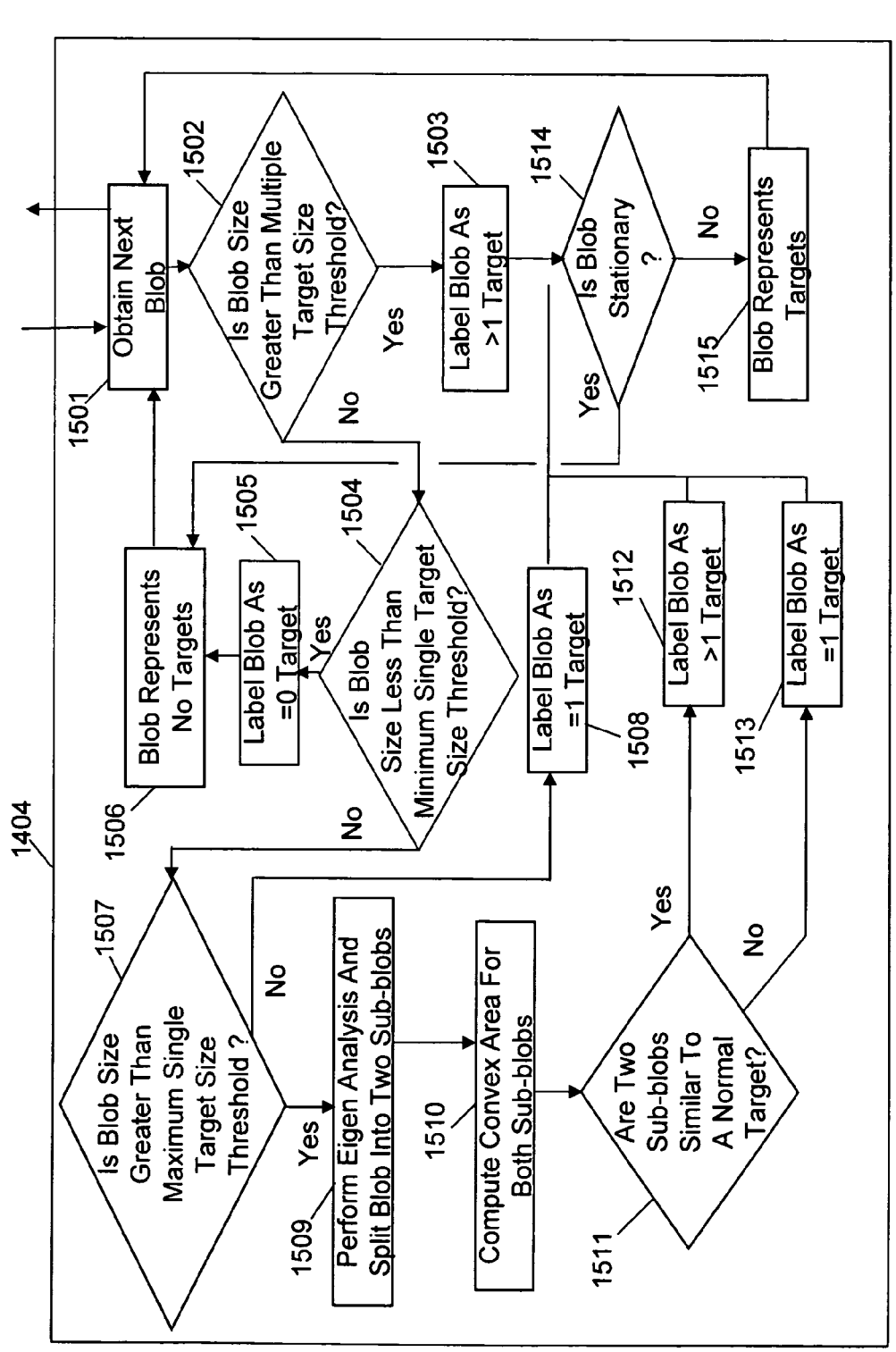
FIG. 15 illustrates an exemplary flow diagram for analyzing blobs according to an exemplary embodiment of the invention.

FIG. 15 illustrates an exemplary flow diagram for analyzing blobs in block 1404 of FIG. 14 according to an exemplary embodiment of the invention. In block 1501, the flow may be initiated for each blob identified in block 1402. Flow may exit block 1501 once all (or a sufficient number) of blobs have been analyzed. In block 1502, the size of the blob may be compared to a multiple target size threshold. For example, the multiple target size threshold may represent a size representing two or more normal targets (e.g., two or more humans). If the size of the blob is greater than the multiple target size threshold, flow may proceed to block 1503; otherwise, flow may proceed to block 1504. In block 1503, the size of the blob may be greater than or equal to the multiple target size threshold, and the blob may be labeled as more than one target (e.g., labeled as ">1 target").

In block 1504, the size of the blob may be compared to a minimum single target size threshold. The minimum single target size threshold may represent a minimum size of a normal target. If the size of the blob is less than the minimum single target size threshold, flow may proceed to block 1505; otherwise, flow may proceed to block 1507. In block 1505, the size of the blob may be less than the minimum single target threshold, and the blob may be labeled as no target (e.g., labeled as "=0 target"). In block 1506, the blob may be designated as representing no targets.

In block 1507, the size of the blob may be compared to a maximum single target size threshold. The maximum single target size threshold may represent an expected maximum size of a normal target. If the size of the blob is less than the maximum single target size threshold, flow may proceed to block 1508; otherwise, flow may proceed to block 1509. In block 1508, the size of the blob may be less than the maximum single target threshold, and the blob may be labeled as one target (e.g., labeled as "=1 target").

If flow proceeds to block 1509, the size of the blob may be less than or equal to the multiple target size threshold but greater than the maximum single target size threshold, and additional analysis may be needed to determine a number of targets represented by the blob (i.e., more than one target or one target). In block 1509, eigen analysis may be performed to determine major and minor axes of the blob. The blob may be split along its minor axis into two sub-blobs. In block 1510, the convex area (e.g., the area of the convex hull) of each sub-blob may be determined.

In block 1511, the sub-blobs may be analyzed to determine if each sub-blob conforms to the normal target. For example, each sub-blob may be analyzed to determine if a shape of the sub-blob is similar to a shape of the normal target. The following analysis may be performed: if the ratio of the of each sub-blob's area to its convex hull area is greater than a minimum target solidity threshold, and if the convex area of each sub-blob is greater than the minimum single target size threshold, then the original blob may be considered to include two targets, and flow may proceed to block 1512; otherwise, flow may proceed to block 1513. In block 1512, the blob may be considered to include two targets, and the blob may be labeled as more than one target (e.g., labeled as ">1 target"). In block 1513, the blob may be considered to include a single target, and the blob may be labeled as one target (e.g., labeled as "=1 target").

In block 1514, flow may be received from blocks 1503, 1508, 1512, and 1513. The blob may be analyzed to determine if it is stationary. To determine if the blob is stationary, techniques such as those described in, for example, U.S. Pat. No. 6,999,600, or U.S. Published Patent Application No. 20060268111, identified above, may be used. If the blob is stationary, flow may proceed to block 1506; otherwise, flow may proceed to block 1515. In block 1515, the blob may be designated as representing targets.

Figure 16:
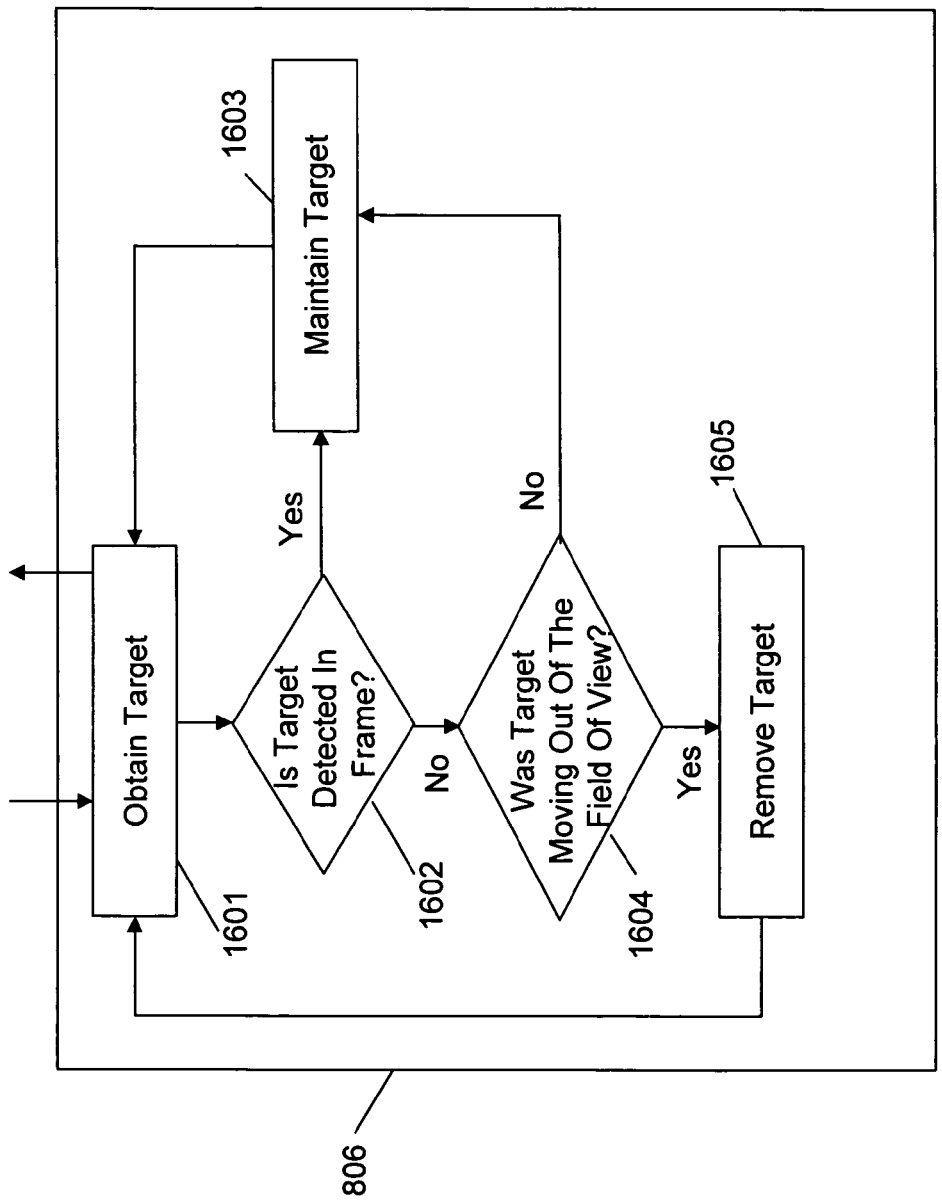
FIG. 16 illustrates an exemplary flow diagram for cleaning targets according to an exemplary embodiment of the invention.

FIG. 16 illustrates a flow diagram for cleaning the modified targets in block 806 of FIG. 8 according to an exemplary embodiment of the invention. In FIG. 16, each target may be analyzed individually. In block 1601, a target may be obtained. In block 1602, the target may be analyzed to determine if the target was detected in the current frame. If the target was detected in the current frame, flow may proceed to block 1603; otherwise, flow may proceed to block 1604. In block 1603, the target detected in the current frame may be maintained. In block 1604, the target may be analyzed to determine if the target was moving out of the field of view of the video camera in a prior frame. If the target was not moving out of the field of view in the prior frame, flow may proceed to block 1603, and the target may be maintained; otherwise, flow may proceed to block 1605. In block 1605, the target may not be detected in the frame, may have been moving out of the field of view, and may be removed from the list of current targets. Flow may exit block 806 once all (or a sufficient number) of targets have been analyzed for cleaning.

In exemplary embodiments of the invention, targets of interest may be detected and tracked based on various features. One challenge in detecting and tracking targets of interest is to robustly address video phenomena such as, for example, shadows or camera automatic gain control (AGC). In an exemplary embodiment, targets may be detected and tracked based on line segment features. In other exemplary embodiments, described in detail below targets may be detected and tracked based on motion block features. Detecting and tracking targets of interest based on the motion block features may be particularly robust in handling low contrast imagery and low texture targets.

Figure 19:
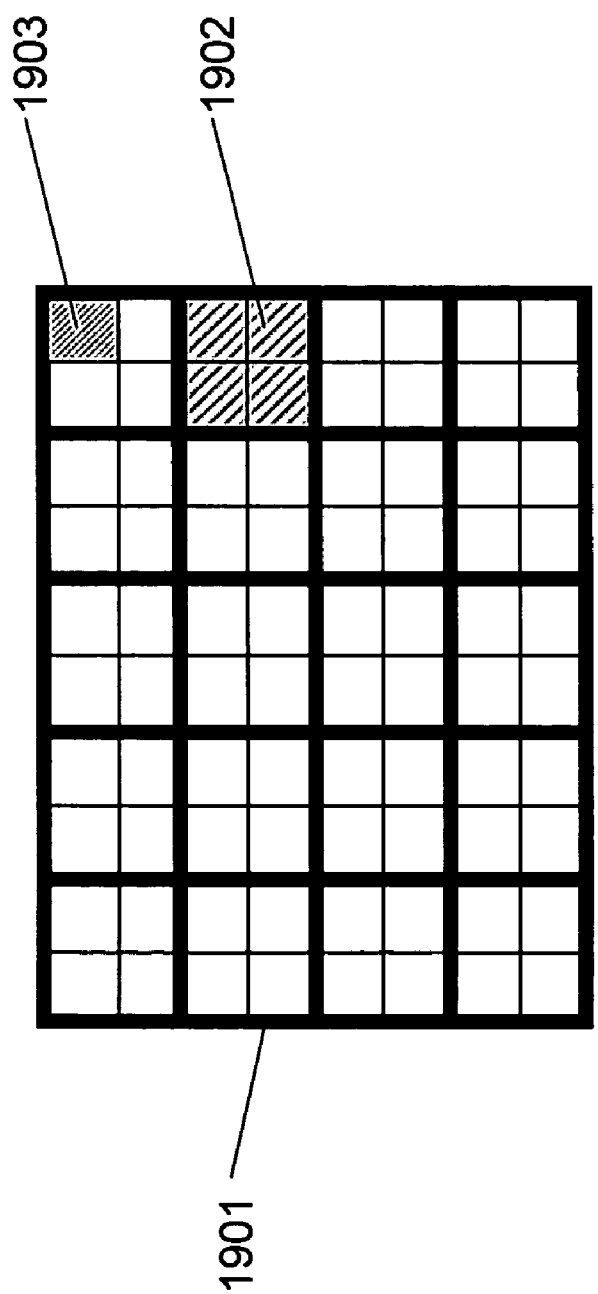
FIG. 19 illustrates motion blocks defined according to an exemplary embodiment of the invention.

FIG. 19 illustrates motion blocks defined according to an exemplary embodiment of the invention. Entire image 1901 of a frame may be evenly divided into a number of coarse blocks 1902. Each coarse block 1902 may be divided into sub-blocks or fine blocks 1903. The size of the coarse block 1902 may be determined by the size of the target(s) of interest. In an exemplary embodiment, the target of interest may cover approximately 64 coarse blocks, and each coarse block may include approximately 4 fine blocks. The motion pixels of the image may be determined as described above in reference to block 301 of FIG. 3. A coarse block or a fine block may be considered to be a coarse motion block or a fine motion block, respectively, if a certain percentage, for example, two thirds of its pixels are motion pixels. An exemplary embodiment of the invention as discussed with respect to and as illustrated in FIGS. 3-16 may be applied to the coarse motion blocks and/or fine motion blocks.

The techniques described above may be combined. For example, the targets may be detected and tracked based on line segments, and/or coarse and fine motion blocks as required by an application. Based on the application scenarios and the system resources, a user may choose one or both of the above techniques for the target detection module.

The line segment and motion block based target detection described above may be used in block 303 of FIG. 3 to identify the targets. Since the line segment feature and the motion block feature are based on the image motion pixels, if a target of interest stops moving, these features may no longer be detected reliably. For many applications, however, it may be important to keep track of targets even when they are not moving. To reliably track stopped target, targets may be tracked and monitored with an automata using the following three motion states: the moving state, the stopped state, and the stationary state.

1) In the moving state, the target is moving so that its location and size may be well represented by the low-level image features such as line segments or motion blocks.

2) In the stopped state, the target is staying at the same location, but still has some local (e.g., internal) motion. For example, at a check out counter, the cashier and the customer may be standing in place (hence not in a moving state), but their hand and/or body may still move.

3) In the stationary state, the target is completely motionless, for example, a stopped shopping cart.

Figure 20:
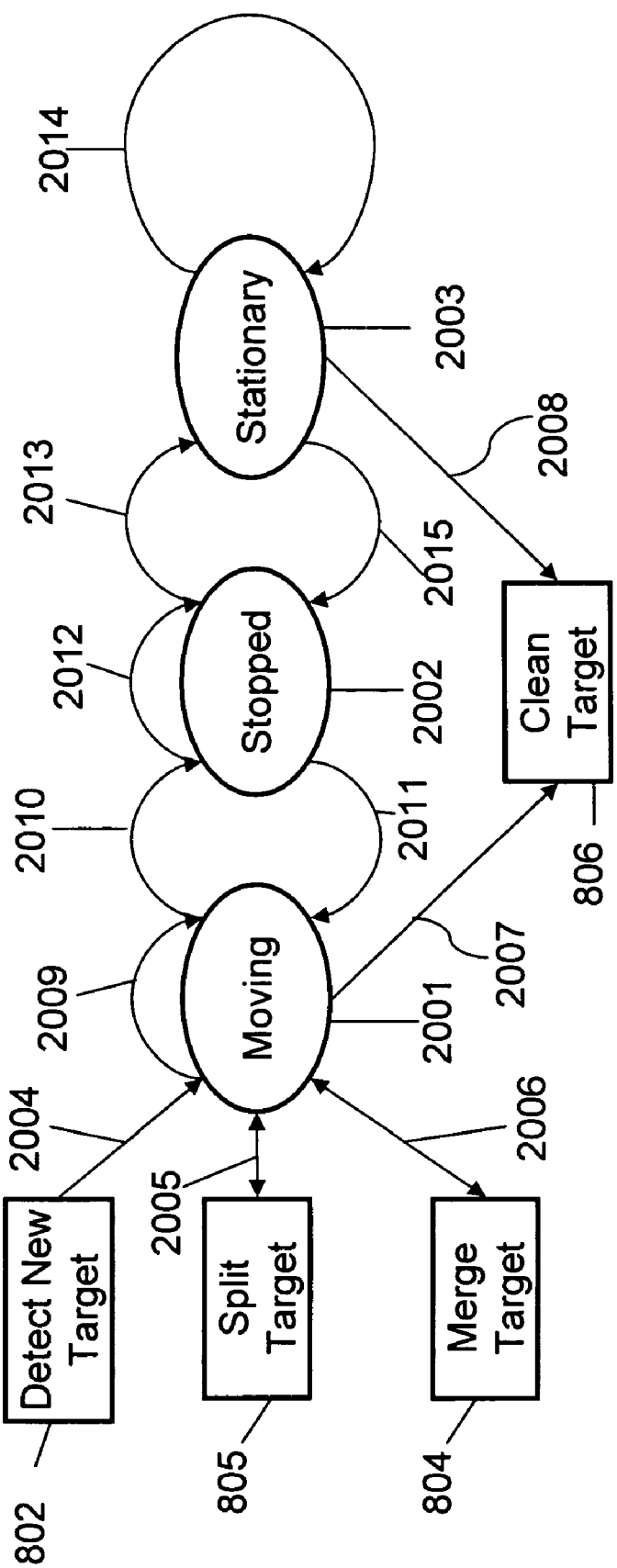
FIG. 20 illustrates exemplary state transitions among three target motion states according to an exemplary embodiment of the invention.

FIG. 20 illustrates the state transitions among three target motion states such as a moving state 2001, a stopped state 2002, and a stationary state 2003. The motion states 2001, 2002, 2003 may be used to represent the motion of a target using a state machine with state transitions, as illustrated in FIG. 20.

As described above in reference to FIG. 8, a new target may be generated in block 802 as a detected new target, in block 805 as a split target, or in block 804 as a merged target. Via a state transition 2004, 2005, or 2006, the initial motion state for the new target may be the moving state 2001. From the moving state 2001, the target may be split in block 805 via state transition 2005 or merged in block 804 via state transition 2006, and the result returned to the moving state 2001 via state transition 2005 or 2006, respectively.

If a target moves out of the scene while in the moving state 2001 or it becomes completely stopped while in the stationary state 2003, the target is cleaned (i.e., removed from tracking) in block 806 via state transition 2007 or state transition 2008, respectively. If a target becomes completely stopped while in the stationary state 2003, the target may be considered to be a passive target. A passive target may refer to a target that may not move by itself, such as a shopping cart. In contrast, an active target may refer to a target that may move by itself without outside force, such as a human. Distinguishing between active and passive targets may be valuable in certain applications. For example, in some applications, shopping carts (e.g., passive targets) should not be counted as customers (e.g., active targets), or standing people (e.g., active target) should not be determined to be a left target (e.g., passive target). The technique to classify active and passive targets using the moving state is described with respect to FIG. 21, which illustrates that an active target may have a different motion state transition history from that of a passive target.

The target may loop from the moving state 2001 back to the moving state 2001 via a state transition 2009 when adequate low-level image features, such as moving line segments or moving blocks at the predicted target location, may still be observed. Adequate low-level image features may refer to the observed features that may provide a good description of the target at the current frame which matches with the predicted target based on its previous appearances. The adequateness may be measured by a ratio $R\_m$ of the current observed image feature quantity over the average quantity of the image feature observed over the previous frames in moving state 2001. If the ratio is greater than a user controllable second or moving-stopped threshold $T\_ms$, the target may be considered to still be in the moving state 2001 via the state transition 2009, and the location and size of the target may be updated and refined in blocks 801 and 803.

The target may move from the moving state 2001 to the stopped state 2002 via a state transition 2010. With the state transition 2010, substantially fewer low-level features of the target may be observed, when compared to the average amount of features observed for the moving state 2001. The target is not moving out of the image frame. The second threshold $T\_ms$ may be used to determine if the target should state transition to the stopped state 2002.

The target may move from the stopped state 2002 to the moving state 2001 via a state transition 2011. With the state transition 2011, if the observed low-level motion features of the target increase substantially, as for example, the $R\_m$ ratio is greater than a user controllable stopped-to-moving or third threshold $T\_sm$, the target may be considered as going back to the moving state 2001. For the selection of the threshold values $T\_ms$ and $T\_sm$, a hysteresis thresholding strategy may be employed, where the third threshold value $T\_sm$ is greater than the second threshold value $T\_ms$, which implies that the target may not be switching back and forth between the moving and stopped states 2001, 2002 without adequate motion by the target.

The target may loop from the stopped state 2002 back to the stopped state 2002 via a state transition 2012. The target may be considered as staying in the stopped state 2002 when there may still be observable low-level image motion features. At this time, the ratio $R\_min$ may be less than the third threshold $T\_sm$ but greater than a fourth or stopped-to-stationary threshold $T\_ss0$. When a target is in the stopped state 2002, the update on the target location and size may rely more on previous observations of the target than on the current observations of the target.

The target may move from the stopped state 2002 to the stationary state 2003 via a state transition 2013. More specifically, if no low-level motion features are observed or the ratio $R\_m$ is less than the fourth threshold $T\_ss0$ for a target in the stopped state 2002, the target may transition to the stationary state 2003 via the state transition 2013. When a target is in the stationary state 2003, size and location of the target may be assumed to be fixed.

The target may loop from the stationary state 2003 back to the stationary state 2003 via a state transition 2014 when there are no low-level image motion features may be observed within the bounding box of the target or the value of the ratio $R\_m$ is less than a fifth or stationary-to-stopped threshold $T\_ss1$. Again, a hysteresis thresholding strategy may be applied which requires that the fifth threshold $T\_ss1$ is slightly greater than the fourth threshold $T\_ss0$.

The target may move from the stationary state 2003 to the stopped state 2002 via a state transition 2015 when there is a small amount of motion features observed within the bounding box of the target. The ratio $R\_m$ is greater than the fifth threshold $T\_ss1$.

To distinguish between passive targets and active targets history of the moving state of the target based on the state automata as illustrated in FIG. 20 may be used. In an exemplary application of the invention, such as in the POS transaction verification application, passive targets (e.g., shopping carts) may need to be distinguished from active targets (e.g., humans) when the target has no significant movement. As an example, a person may push a shopping cart to a checkout counter, and when the person stops, the shopping cart may also stop. For the shopping cart target, there is no location change or internal motion. The cart may have state transitioned from the moving state 2001 to the stopped state 2002 via the state transition 2010, and then to the stationary state 2003 via the state transition 2013. In contrast, for the human target, some local motion may still be observed. The person may have state transitioned from the moving state 2001 to the stopped state 2002 via the state transition 2010, and then may be in the stationary state 2002 for a very short period of time.

Figure 21:
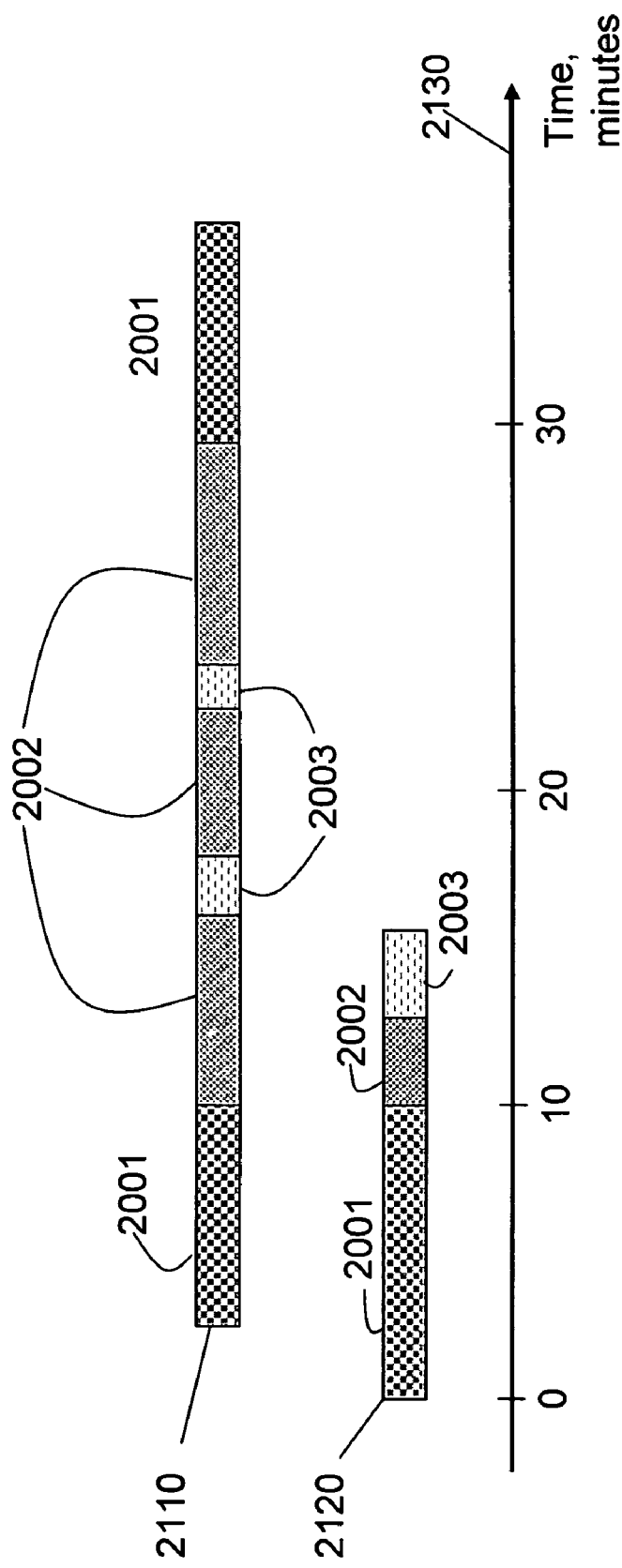
FIG. 21 illustrates exemplary motion state histories of a human target and a shopping cart target according to an exemplary embodiment of the invention.

FIG. 21 illustrates exemplary motion state histories 2110, 2120 of a human target and a shopping cart target, respectively, for this example. Time line 2130 may indicate the time. The moving state history 2110 of the human target may indicate the motion states of the person through time. The moving state history 2120 of the shopping cart target may indicate the motion states of the shopping cart through time. Thus, a target may be considered to be a passive target when its duration in the stationary state 2003 becomes longer than its previous duration in the stopped state 2002, and the target may no longer be tracked.

Figure 22:
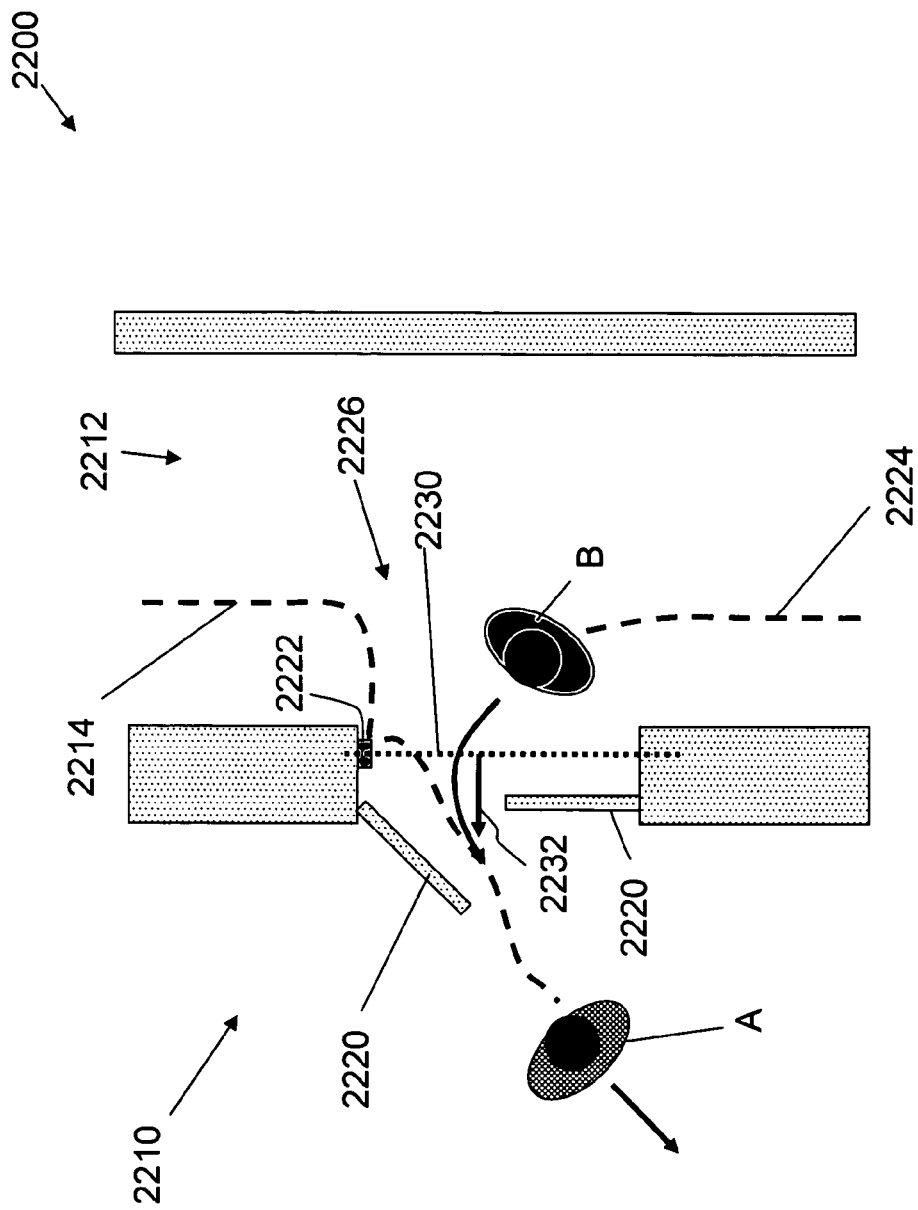
FIG. 22 illustrates a tailgating scenario according to an exemplary embodiment of the invention.

FIG. 22 illustrates a tailgating scenario 2200 according to an exemplary embodiment of the invention. The tailgating scenario 2200 may occur at an access point to a secured area 2210. For this exemplary embodiment, the video surveillance system 1810 as illustrated in FIG. 18 may be used. An exemplary requirement for each normal entrance may be that the person must use an access control system by sliding a keycard and/or entering a password. An objective of the video surveillance system 1810 may be to detect any person that enters the secure area 2210 by tailgating another person. For example, as in FIG. 22, person A may enter a public hallway 2212 via a first path 2214 and enter a security door 2220 after entering a correct code at an access pad 2222. But before the door 2220 is closed, person B may move forward via a second path 2224 and enter the secured area 2210 without inputting the access code. To automatically detect this type of tailgating event, an intelligent video surveillance system may be used in conjunction with the existing access control system 1820 of FIG. 18. The access control system 1820 may provide event reports on each valid access (e.g., a valid keycard swipe or a valid password entry), while the intelligent video surveillance system 1810 may monitor an entrance area 2226 and count a number of persons entering the door 2220. To count the number of persons entering the door 2220, a video tripwire 2230 may be identified in front of the door 2220 with a direction 2232 of the video tripwire 2230 facing inside and away from the entrance area 2226. The number of persons entering the security door 2220 may be considered to be the number of tracked human targets crossing the video tripwire 2230. Additional details on the video tripwire techniques can be found in existing literature, for example, in U.S. Pat. No. 6,696,945, identified above. A tailgating alarm may be triggered when the number of human targets entering the door 2220 is greater than the number of valid access control instances (e.g., valid keycard swipes or valid password entries) received by the access control system 1820.

In the above exemplary access control application, the lighting of the scene (such as an indoor scene) may be conducive to artifacts of the targets, such as shadows, reflections, and/or camera automatic gain control (AGC) effects. These artifacts may be too strong to be ignored by the motion detection procedure for target identification and tracking in block 303 and block 304. Thus, the target size detected by the system may not be accurate enough to provide an accurate human counting estimation. To address the effects of such artifacts, both background and foreground texture analysis may be used to extract more accurate sizes of the targets.

Figure 23:
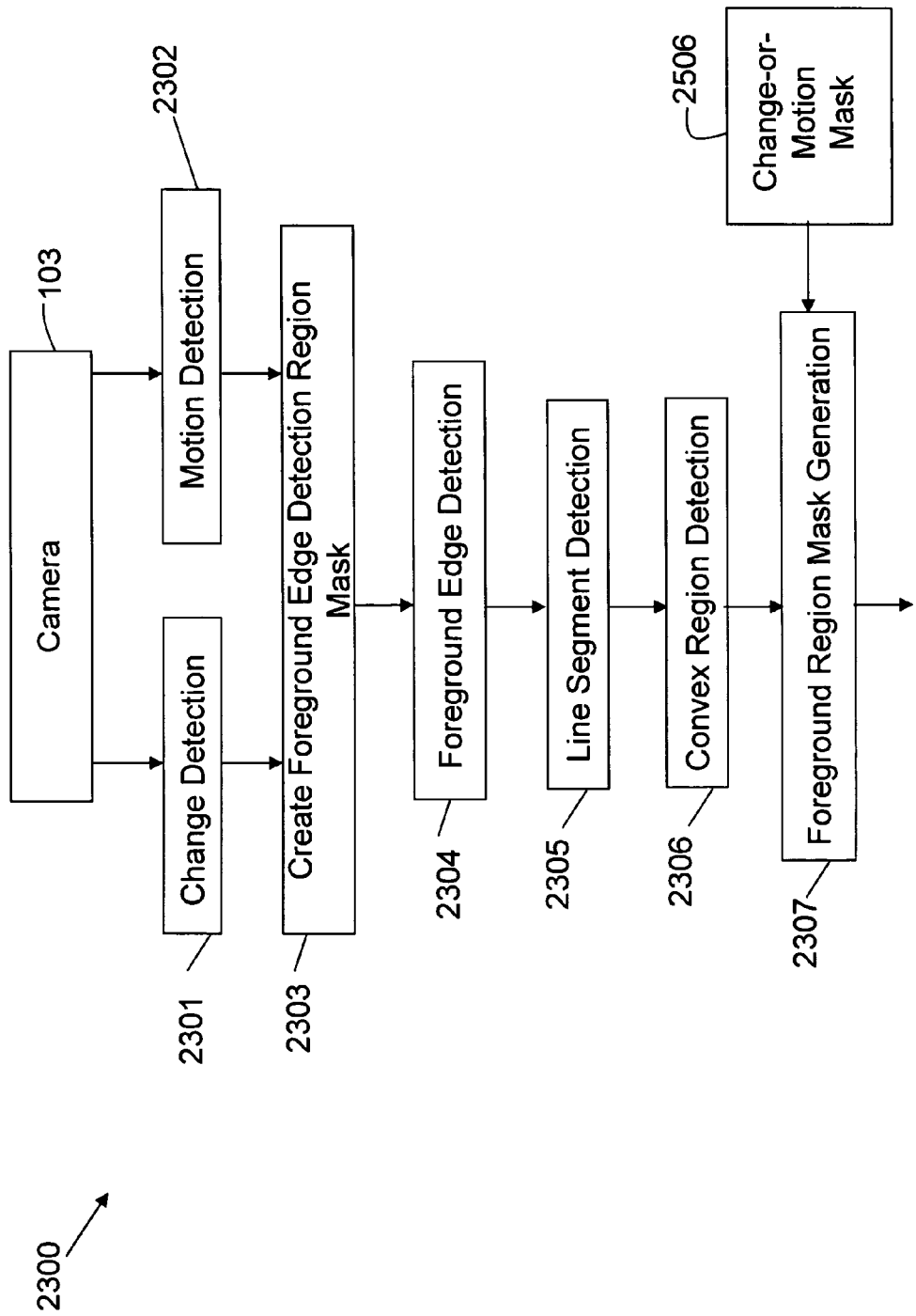
FIG. 23 illustrates an exemplary flow diagram to detect a target area in a video frame according to an exemplary embodiment of the invention.

FIG. 23 illustrates an exemplary flow diagram 2300 to detect a target area in a video frame for block 303 according to an exemplary embodiment of the invention. FIGS. 24A-24I illustrate exemplary processing results for the blocks in the flow diagram 2300 of FIG. 23 according to an exemplary embodiment of the invention.

In blocks 2301 and 2302, change pixels and moving pixels may be detected in the video stream using, for example, statistical pixel modeling, three-frame differencing, or other technique as described, for example, in U.S. Pat. No. 6,625,310, or U.S. Pat. No. 6,999,600, identified above. A change mask and a motion mask may be extracted. FIG. 24A shows one frame in an example video stream. FIGS. 24B and 24C show the corresponding change mask and motion mask, respectively, from blocks 2301 and 2302, respectively. In this exemplary indoor scenario, the shadows on the floor and the reflections on the walls and doors may cause problems for the system to provide accurate estimations of the size and location of each target.

In block 2303, a foreground edge detection region mask may be created. An objective of block 2303 may be to produce a region mask which includes all non-controversial foreground edges. Inputs to the block 2303 may be outputs from the change detection block 2301 and the motion detection block 2302. An exemplary embodiment of block 2303 is discussed below with respect to FIG. 25.

Figure 25:
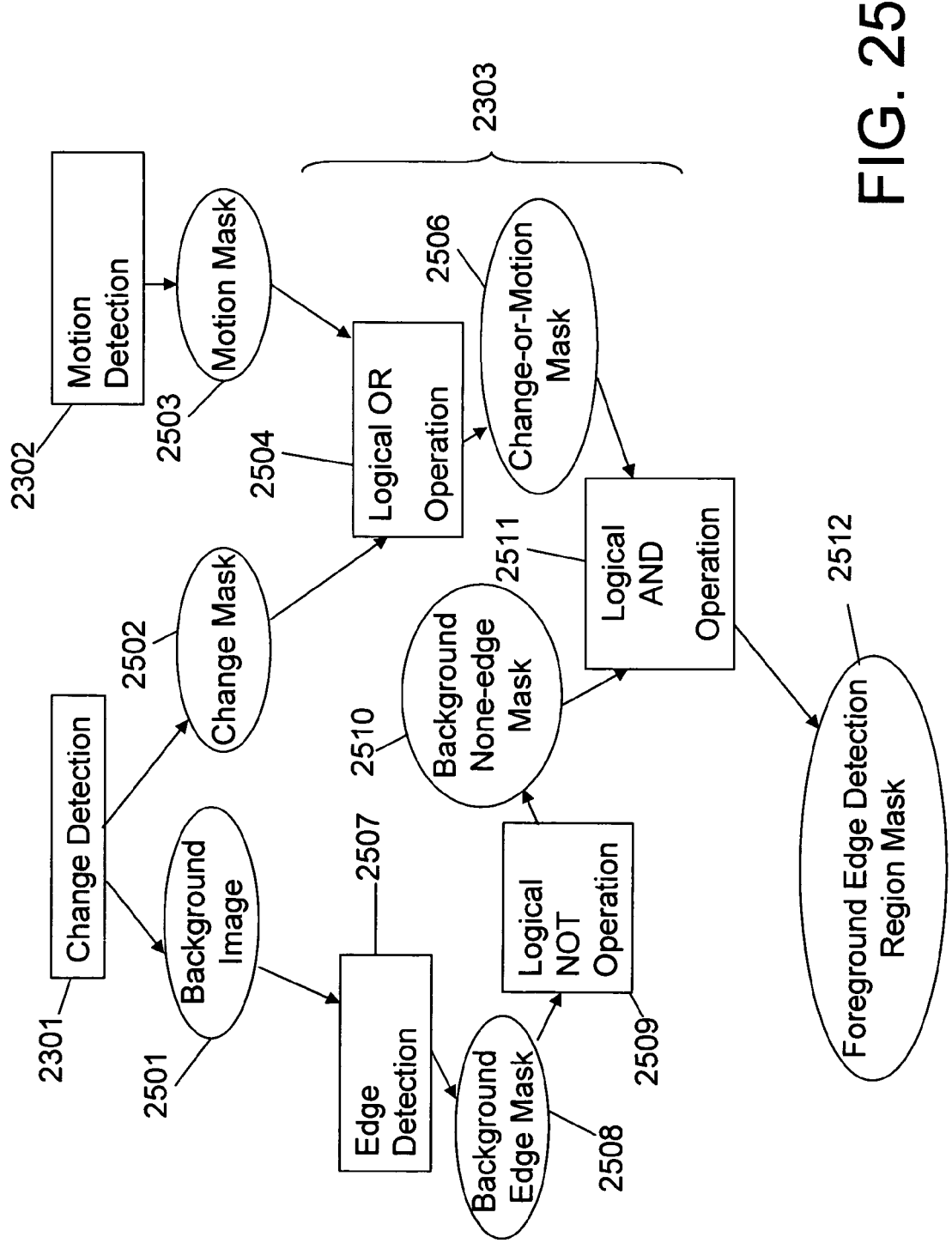
FIG. 25 illustrates an exemplary flow diagram to create a foreground edge detection region mask according to an exemplary embodiment of the invention.

FIG. 25 illustrates an exemplary flow diagram to create a foreground edge detection region mask in block 2303 of FIG. 23. The inputs may be a background image 2501, a change mask 2502 from the change detection block 2301, and a motion mask 2503 from the motion detection block 2302. Because the change mask 2502 and the motion mask 2503 may be noisy, morphological operations may optionally be applied to the masks 2502, 2503 to fill holes within a target region. In block 2504, a logical OR operation may be performed on the change mask 2502 and the motion mask 2503 to produce a change-or-motion mask 2506, which may include both the real targets and possibly their shadows and reflections. In block 2507, an edge detection may be applied to the background image 2501 to detect the background edges and obtain a background edge mask 2508. As an example, FIG. 24D shows an exemplary background image 2501. The background edge mask 2508 may be excluded from the foreground edge detection region mask because the background may interference with the foreground edges. In block 2509, a logical NOT operation may be applied to the background edge mask 2508 to obtain a background non-edge mask 2510. As an example, FIG. 24E shows an exemplary background non-edge mask 2510. In block 2511, a logical AND operation may be applied to the background non-edge mask 2510 and the change-or-motion mask 2506 to obtain the foreground edge detection region mask 2512. As an example, FIG. 24F shows an exemplary foreground edge detection region mask 2512.

With reference again to FIG. 23, in block 2304, foreground edge detection may be performed on the foreground edge detection region mask 2512. Edge detection techniques similar to those described in reference to the block 402 of FIG. 4 may be applied in block 2304. As an example, FIG. 24G shows an exemplary detected foreground edge mask. In block 2305, line segment detection may be performed on the detected foreground edge mask obtained in block 2304. Line segment detection techniques similar to those described in reference to the block 302 of FIG. 3 may be applied in block 2305. In block 2306, individual convex regions may be obtained by clustering line segments from block 2305. An exemplary embodiment of block 2306 is discussed below with respect to FIG. 26. As an example, FIG. 24H shows exemplary detected line segments 2410 and the convex regions 2420. In block 2307, the foreground region mask may be obtained based on the convex regions 2420 from block 2306 and the change-or-motion mask 2506 from block 2303. The foreground region mask may be considered to be the change-or-motion area within each detected foreground convex region 2420. The foreground region mask may be obtained by performing a logical AND operation of the change-or-motion mask 2506 and the convex regions 2420 from block 2306. As an example, FIG. 24I shows an exemplary foreground region mask. As can be seen with this example, the exemplary foreground region mask of FIG. 24I may be more accurate in detecting the two people in the image than either an exemplary change mask of FIG. 24B or an exemplary motion mask of FIG. 24C.

Figure 26:
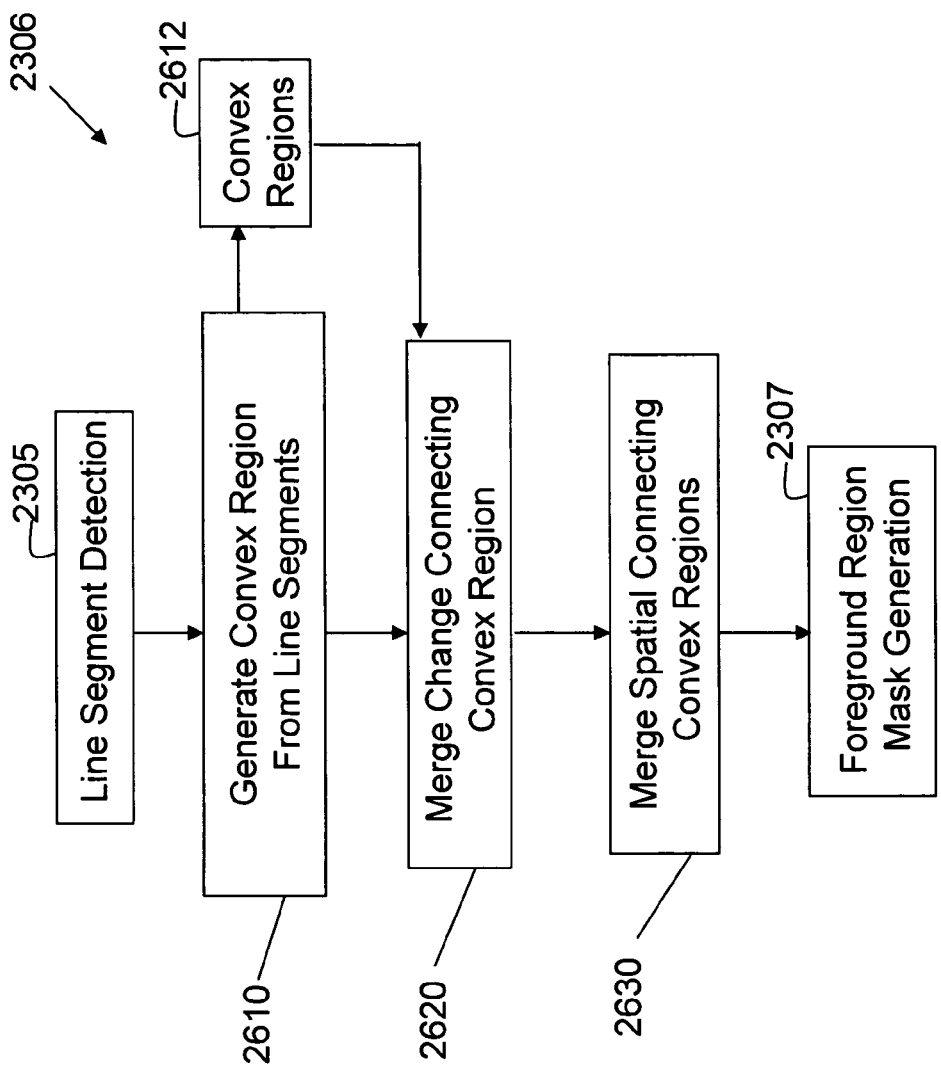
FIG. 26 illustrates an exemplary flow diagram to detect convex regions according to an exemplary embodiment of the invention.
Figure 27B:
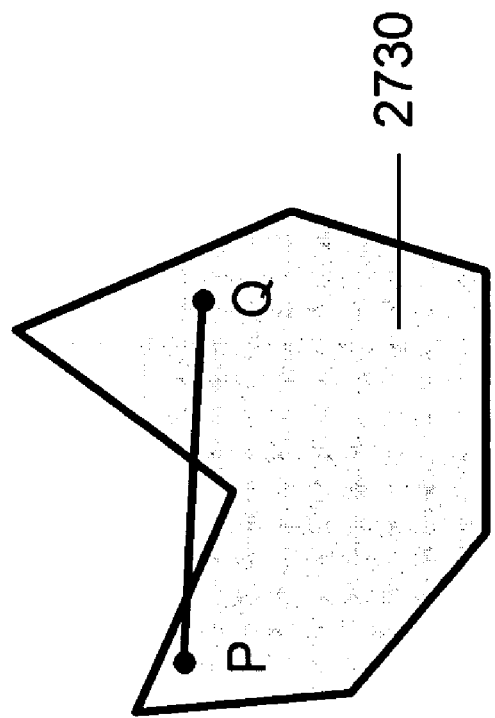
FIG. 27B illustrates an exemplary non-convex region according to an exemplary embodiment of the invention.
Figure 27A:
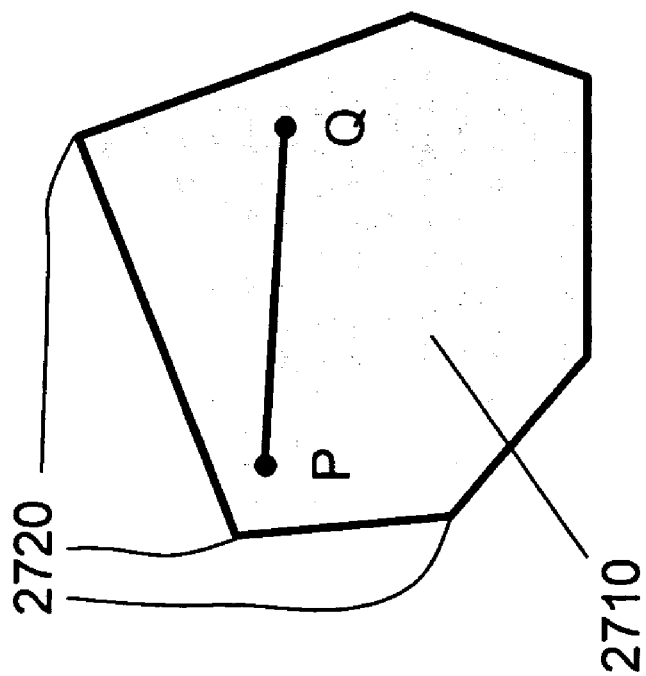
FIG. 27A illustrates an exemplary convex region according to an exemplary embodiment of the invention.

FIG. 26 illustrates an exemplary flow diagram 2306 for generating convex foreground regions according to an exemplary embodiment of the invention. A convex region may be defined as an image region enclosed by a convex hull as the region boundary. The convex hull of a geometric object (such as a point set or a polygon) may be the smallest convex set including that object. There are many equivalent definitions for a convex set S. As an example, a set S is convex if whenever two points P and Q are inside S, the entire line segment PQ is also in the set S. Every point in the smallest convex set S is called a pivot point. FIG. 27A illustrates a concept of a convex hull region 2710 including pivot points 2720. FIG. 27B illustrates a concept of a non-convex hull region 2730.

In block 2610, initial convex regions 2612 may be generated by clustering neighboring line segments. If a distance between two line segments is less than a threshold, the two line segments may be assigned to a same cluster. The threshold may be a fraction of the average target image size. The start and end points of the line segments in a line segment cluster may be used to determine the convex hull of the region. Techniques to determine the convex hull of a set of discrete points are available in the existing literature. A goal of the convex region analysis may be to find the convex hull for each individual target in the video. After the initial convex region segmentation, each convex region may not represent a complete target because some targets may not have strong textures everywhere within the target boundaries. In block 2620, change connecting convex regions may be merged into one or more larger convex regions. Change connecting convex regions may refer to convex regions whose connecting region or the image area between the two convex regions has substantial change as compared to the corresponding reference background image. An exemplary embodiment of block 2620 is discussed below with respect to FIG. 28. In block 2630, spatial connecting convex regions may be merged into one or more larger convex regions. Spatial connecting convex regions may refer to convex regions that overlap with each other. Overlapping convex regions may be identified by testing if any pivot point of one convex region is inside another convex region.

Figure 28:
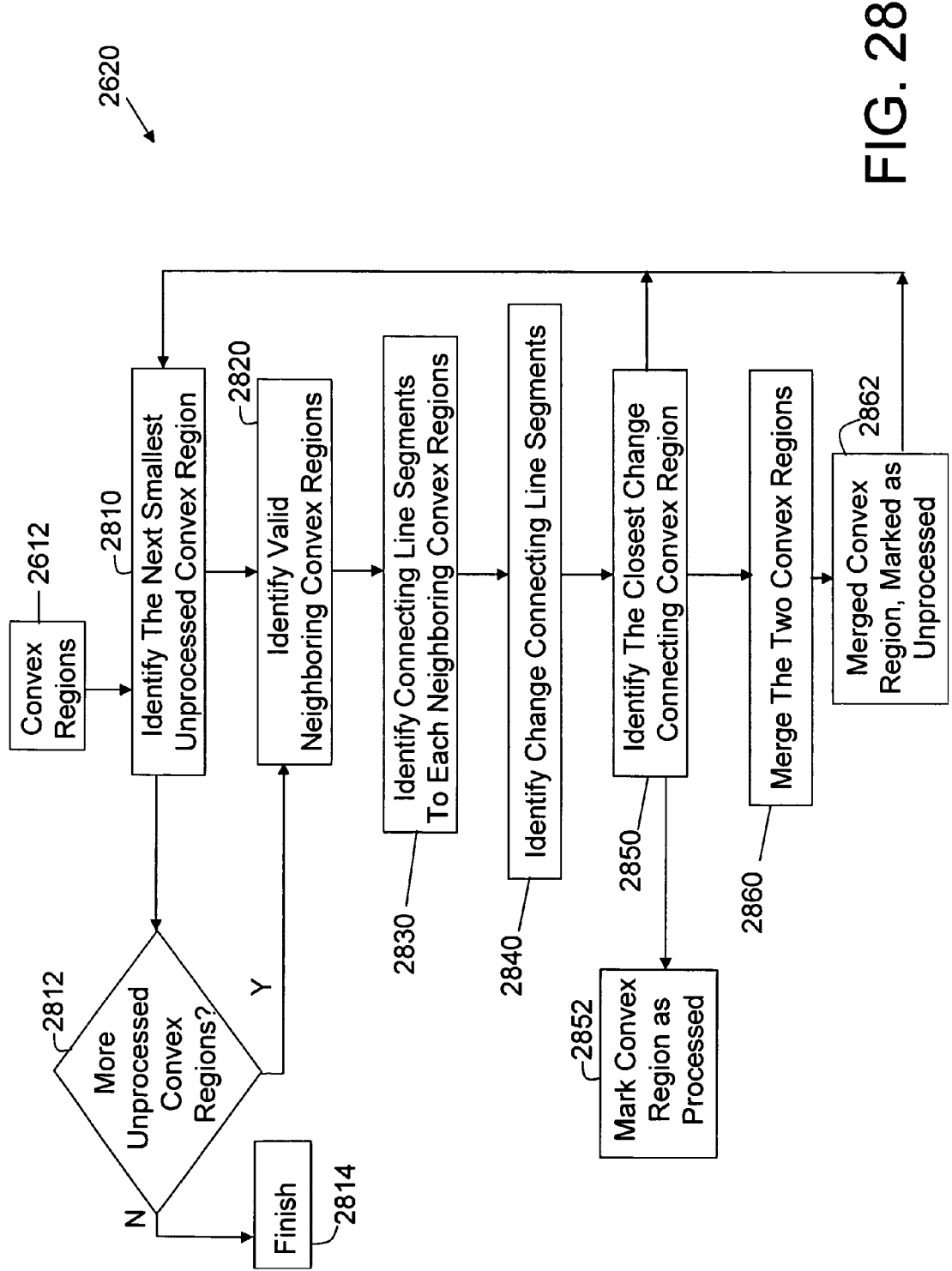
FIG. 28 illustrates an exemplary flow diagram to merge change connecting convex regions according to an exemplary embodiment of the invention.

FIG. 28 illustrates an exemplary flow diagram for determining the closest change connecting convex region to a given convex region for block 2620 according to an exemplary embodiment of the invention. The flow may be performed iteratively on all initial convex regions 2612 generated by block 2610 until every convex region is processed. In block 2810, the smallest unprocessed convex region may be identified. If there is no unprocessed convex region, the flow 2620 may proceed to block 2814 and exit. Otherwise, the flow proceeds to block 2820.

In block 2820, valid neighboring convex regions of the identified convex region may be identified based on criteria. For example, a first criteria may specify that the neighboring convex region must be a direct neighbor of the convex region under consideration. The first criteria may be tested by examining the line segment connecting the centroid points of the two convex regions. If there is no point on the line segment that is inside another convex region, the two convex regions may be considered to be direct neighbors. For example, a second criteria may specify that the neighboring convex region must be of a specific size or disposed at a specific distance from the identified convex region so that if the two convex regions merge, the merged convex region would have a size that is smaller than the maximum possible single target size at that position. The maximum possible single target size may be either provided by the operator of the video surveillance system or semi-automatically computed using camera calibration information.

In block 2830, the line segments connecting the identified convex region to the identified valid neighboring convex regions may be identified. A connecting line segment between two convex regions may be determined by examining a line segment connecting a pivot point in one convex region with the centroid point in the other convex region. The two end points of such line segment, which lie on the boundary of the two convex regions, define the connecting line segment. No point on the connecting line segment lies inside any of the two convex regions. The maximum number of connecting line segments is the sum of the number of pivot points of the two convex regions. An exemplary embodiment of block 2830 is discussed below with respect to FIG. 29.

In block 2840, change connecting line segments may be identified. For each connecting line segment from block 2830, an average change measure may be initially determined by determining the mean changes on the pixel locations along the connecting line segment. For each pixel of the connecting line segment, the change value may be the absolute difference value between the current video frame and the background image 2501 from the change detection block 2301 for that pixel location. If the mean change of a connecting line segment is greater than a threshold, the connecting line segment may be considered as a change connecting line segment. The threshold may be determined based on the mean change magnitudes of the two convex regions. A change magnitude for each pixel in a convex region may be determined as the absolute difference value between the current video frame and the background image 2501 from the change detection block 2301 for that pixel location. The mean change magnitude of a convex region may be the mean of the change magnitudes for the convex region. The threshold to determine whether a connecting line segment is a change connecting line may be determined as a smaller value of two mean change magnitudes of two convex regions, which may ensure that the mean change on the line is greater than the mean change of one of the convex regions.

In block 2850, a closest change connecting region may be identified. If one valid neighboring convex region from block 2820 has one change connecting line segment from block 2840, this convex region may be considered to be a change connecting region. If only one change connecting region is identified, this region may be considered to be the closest change connecting region. If multiple change connecting regions are identified, the closest change connecting region may be determined as the convex region having the shortest region-to-region distance to the identified unprocessed convex region from block 2810. The region-to-region distance may refer to the shortest distance of the connecting line segments between two regions. If no change connecting region is identified, in block 2852, the identified unprocessed convex region from block 2810 may be marked as processed, and flow may proceed back to block 2810 to determine and process the next smallest unprocessed convex region.

If the change connecting region is identified, in block 2860, the closest change connection convex region from block 2850 may be merged with the identified unprocessed convex region from block 2810. The two convex regions may be merged by forming a new convex region using the pivot points from the two convex regions. The merged convex region 2862 may replace the two convex regions and be marked as unprocessed. Once the merging is complete, flow may return to block 2810 to determine and process the next smallest unprocessed convex region.

Figure 29:
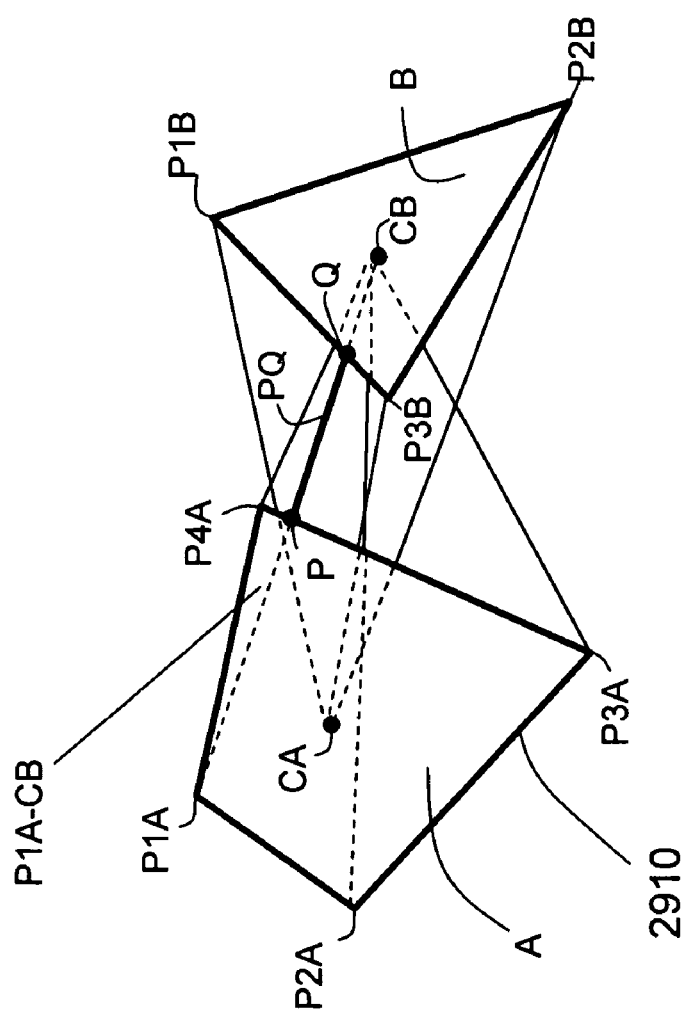
FIG. 29 illustrates connecting line segments of two exemplary convex regions according to an exemplary embodiment of the invention.

FIG. 29 illustrates determining connecting line segments of two sample convex regions for block 2830 according to an exemplary embodiment of the invention. FIG. 29 includes two exemplary convex regions A and B. The convex region A has four pivot points P1A, P2A, P3A and P4A. The convex region B has three pivot points P1B, P2B and P3B. For each pivot point, a connecting line segment between the convex regions A, B may be determined. To determine the connecting line segment, each convex region A, B may be examined. A connecting line segment for the line segment P1A-CB may be determined, where the line segment P1A-CB may connect the pivot point P1A of the region A and a centroid point CB of the region B. Intersection points between the line segment P1A-CB and boundary line segments 2910 of region A may be determined as points P1A and P. The distance from each intersection point P1A, P to the centroid point CB in region B may be determined. The intersection point with the shortest distance to the centroid point CB may be determined to be an end point in region A for the connecting line segment, e.g., point P in this example. To examine the region B, a similar technique is employed. An end point in region B for the connecting line segment may be determined, which is point Q in this example. Thus, line segment P-Q is the connecting line segment determined by pivot point P1A. Similarly, for this example, the remaining three connecting line segments for line segments connecting the pivot points P2A, P3A, P4A with the centroid point CB of the region B may be determined using this technique. Further, three connecting line segments for line segments connecting the pivot points P1B, P2B, P3B with the centroid point CA of the region A may be determined.

Figure 30:
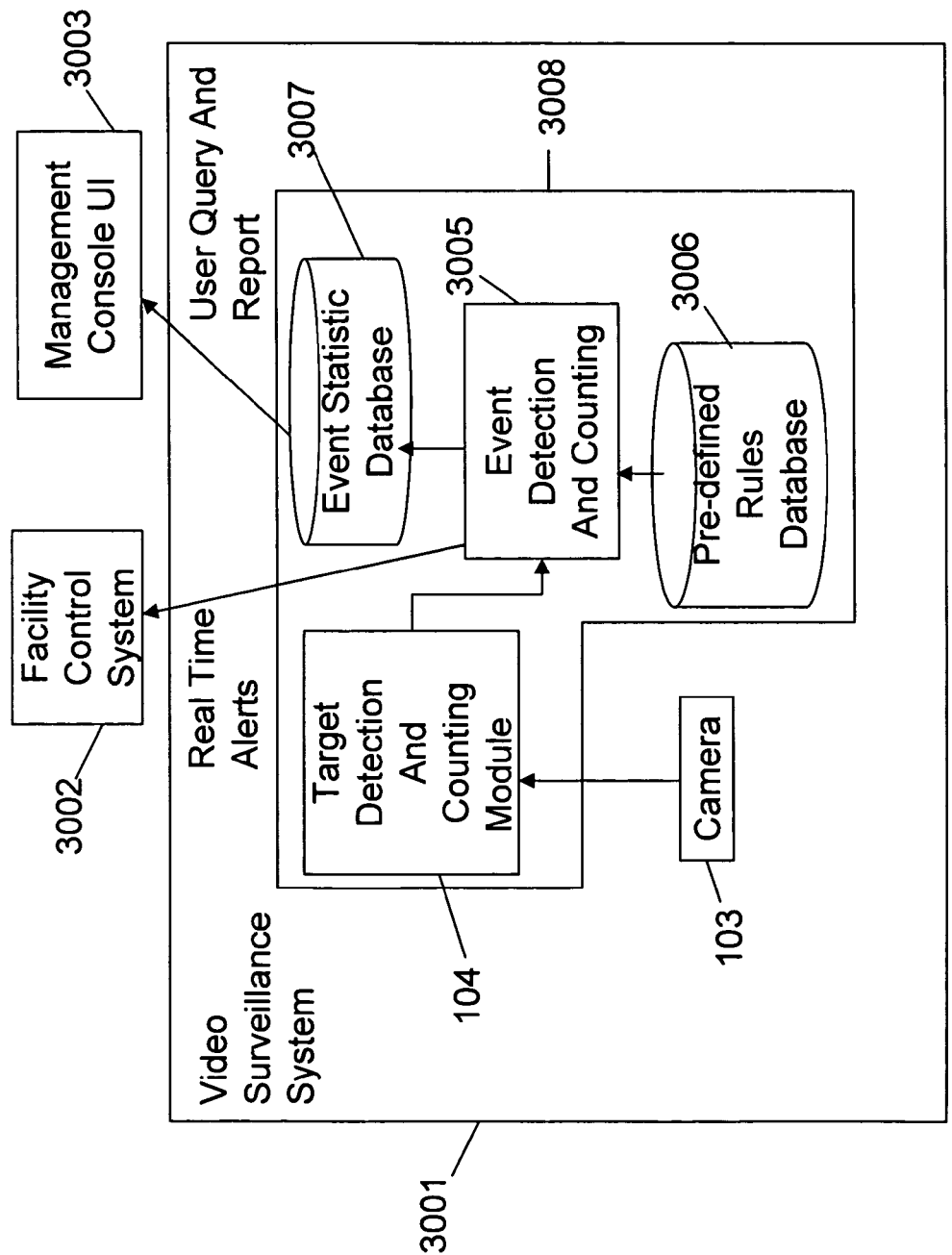
FIG. 30 illustrates an exemplary video surveillance system for occupancy analysis and queue length estimation according to an exemplary embodiment of the invention.
Figure 31:
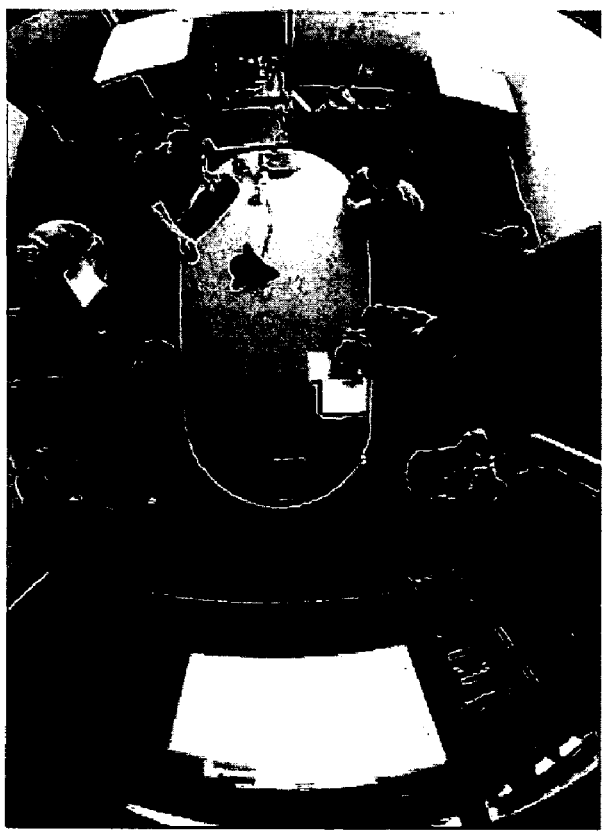
FIG. 31 illustrates an exemplary frame from a video stream from the occupancy video surveillance system according to an exemplary embodiment of the invention.

As another exemplary embodiment, the invention may be used for occupancy detection and estimate. In FIGS. 30 and 31, the invention is illustrated for use in building occupancy and energy saving applications. FIG. 30 illustrates a video surveillance system 3001 according to this exemplary embodiment of the invention. For an exemplary building management setting, the video surveillance system 3001 of the invention may interact with a facility control system 3002 and management console or user interface (UI) 3003. The video surveillance system 3001 may include a video camera 103, a target (e.g., human) detection and tracking module 104, an event detection and counting module 3005, a pre-defined rules database 3006 and an event statistic database 3007. FIG. 31 shows an exemplary camera view for the building occupancy applications.

Modules 103 and 104 are similar to those described regarding FIGS. 1 and 18. Facility control system module 3002 may refer to an external control system which may respond to an output of the system 3001. One example of the control module 3002 is an automatic light switch. The video surveillance system 3001 may be used to guide the light switch to control the lights in a room. When there is no person detected in a room, the lights in the room may be automatically turned off to save energy. In addition, the system may also provide the average room occupancy measure for a building or company management team for better organizing the office space resource. This type of occupancy estimation may not be limited for indoor environment and human targets. The invention may also be applied in other scenarios such as garage light control and/or space management.

As another exemplary embodiment, the system described in FIG. 30 may be used for a dwell time detection. For example, in a retail application, by using such system, average people dwelling time in front of a specific merchandise shelf may be determined. A rule, identifying the area of interest and minimum dwelling time, may be set as an input to the pre-defined rules database 3006. The event detection and counting module 3005 may detect the detected and tracked human targets whose location and movement satisfy this rule, and save the data in the even statistic database 3007. The user later may query the average dwelling time in the area of interest.

With reference again to FIG. 8, in modules 801 through 806, the system may assume that the average target size in the image is known. For example, the average target image size information may be specified by the user/operator in advance. However, the average object size may vary depending, for example, on the video camera specification and mounting position, and the image size of an average target. For example, if the video camera is mounted overhead, the same target may have greater image size when appear in a corner of the image than when appear at the center of the image. To obtain accurate target size estimation for any position in the image, a camera may be calibrated.

Figure 32:
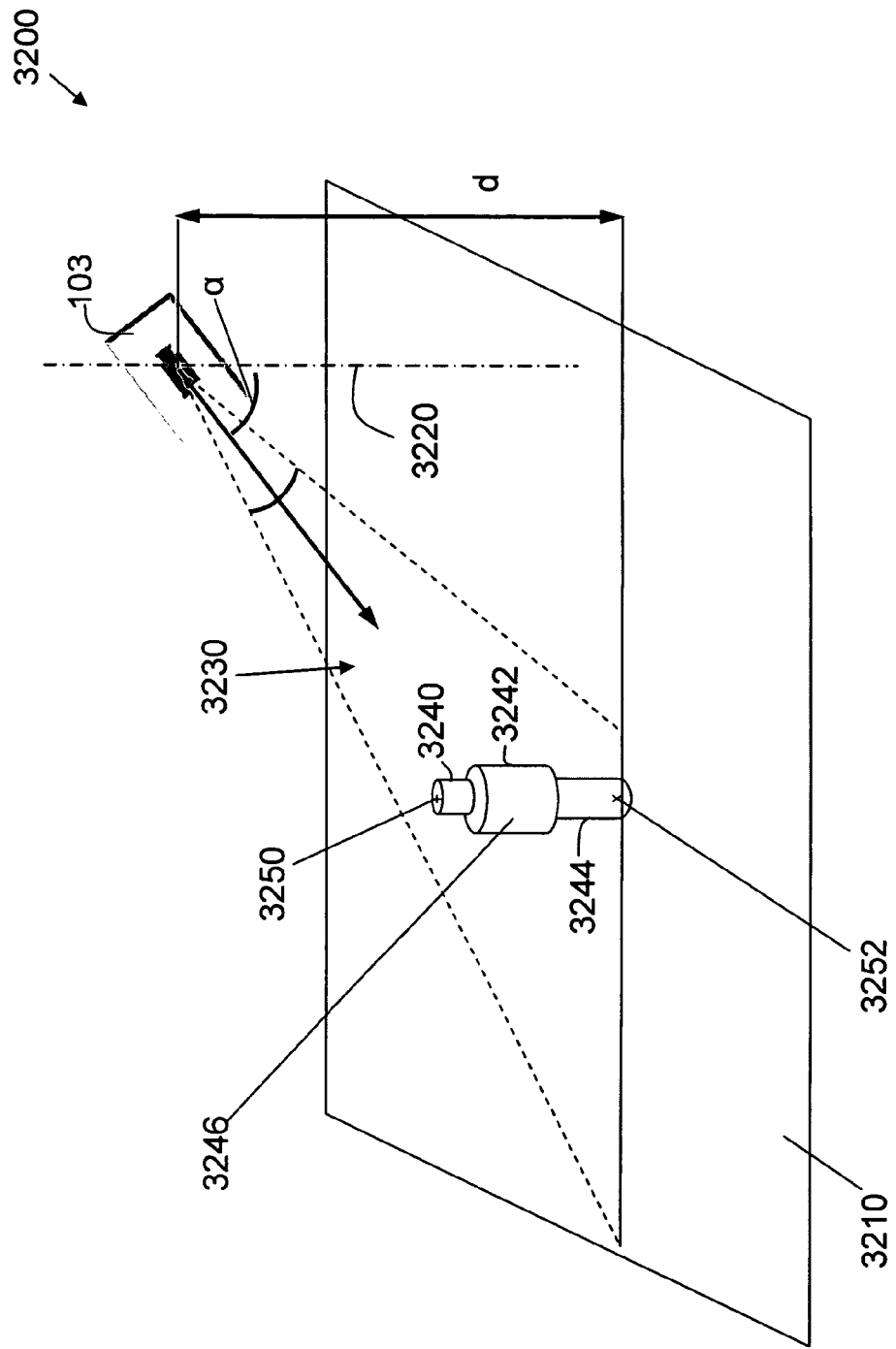
FIG. 32 illustrates a human sample based camera calibration method according to an exemplary embodiment of the invention.

FIG. 32 illustrates an exemplary human sample based camera calibration method 3200 according to an exemplary embodiment of the invention. For example, targets of interest may be disposed on a three dimensional (3D) ground plane 3210. The camera 103 may be mounted at a distance or camera height d from the ground plane 3210 which may be selected to be greater than a height of an average human target. The camera 103 may be tilted up at an angle α from a vertical axis 3220 to view an area of interest or a vertical field of view 3230. In one embodiment, the camera mounting may not provide for camera rolling. For example, if a human target appears in the field of view 3230, the camera 103 may not roll. In one embodiment, calibration parameters may be estimated to calibrate the camera 103 such as the camera height d, the camera tilt-up angle α and the camera vertical field of view 3230 which may be related to the camera relative focal length. For example, the camera vertical field of view 3230 may be equivalent to the camera focal length relative to an image size. As illustrated, first, second and third cylinders 3240, 3242, 3244 may be used as a model 3246 of a 3D human target. The first or top cylinder 3240 may be used to model a human head. A height of the first cylinder 3240 may be equal to approximately 0.3 m or approximately 1'. A radius of the first cylinder 3240 may be equal to approximately 0.1 m or approximately 0.3'. The second or middle cylinder 3242 may be used to model a human body. A height of the second cylinder 3242 may be equal to approximately 0.7 m or approximately 2.25'. A radius of the second cylinder 3242 may be equal to approximately 0.24 m or approximately 0.8'. The third or bottom cylinder 3244 may be used to model human legs. A height of the third cylinder 3244 may be equal to approximately 0.8 m or approximately 2.75'. A radius of the third cylinder 3244 may be equal to approximately 0.15 m or approximately 0.5'. Two critical image points such as a first or head image point 3250 and a second or foot image point 3252 may be identified on the model 3246. The first image point 3250 may be disposed about a top center point of the first cylinder 3240. The second image point 3252 may be disposed about a bottom center point of the third cylinder 3244. Of course, it is contemplated that other like points may be identified in the similar manner.

Using the camera model, human model and, for example, a pin-hole camera imaging model, any points on the 3D human model may be projected onto the image when at least one of the head image point 3250 or foot image point 3252 is known. The camera calibration parameters may be estimated by analyzing a number of user input image samples or targets. For example, each image sample may include the image bounding box, the head image point 3250 and the foot image point 3252 of the target. For a given image sample and a certain set of camera calibration parameters, a matching error between the input image sample and the estimated image sample may be computed based on at least one of the head image point 3250 or foot image point 3252 of the input image sample and the set of camera calibration parameters. The best camera calibration parameters which provide the minimum average matching error on the input image samples may be determined iteratively.

The camera calibration method described above may provide accurate and quick human target size estimation on the image without a lengthy and costly calibration procedure by using samples of targets in the image frame.

Figure 33A:
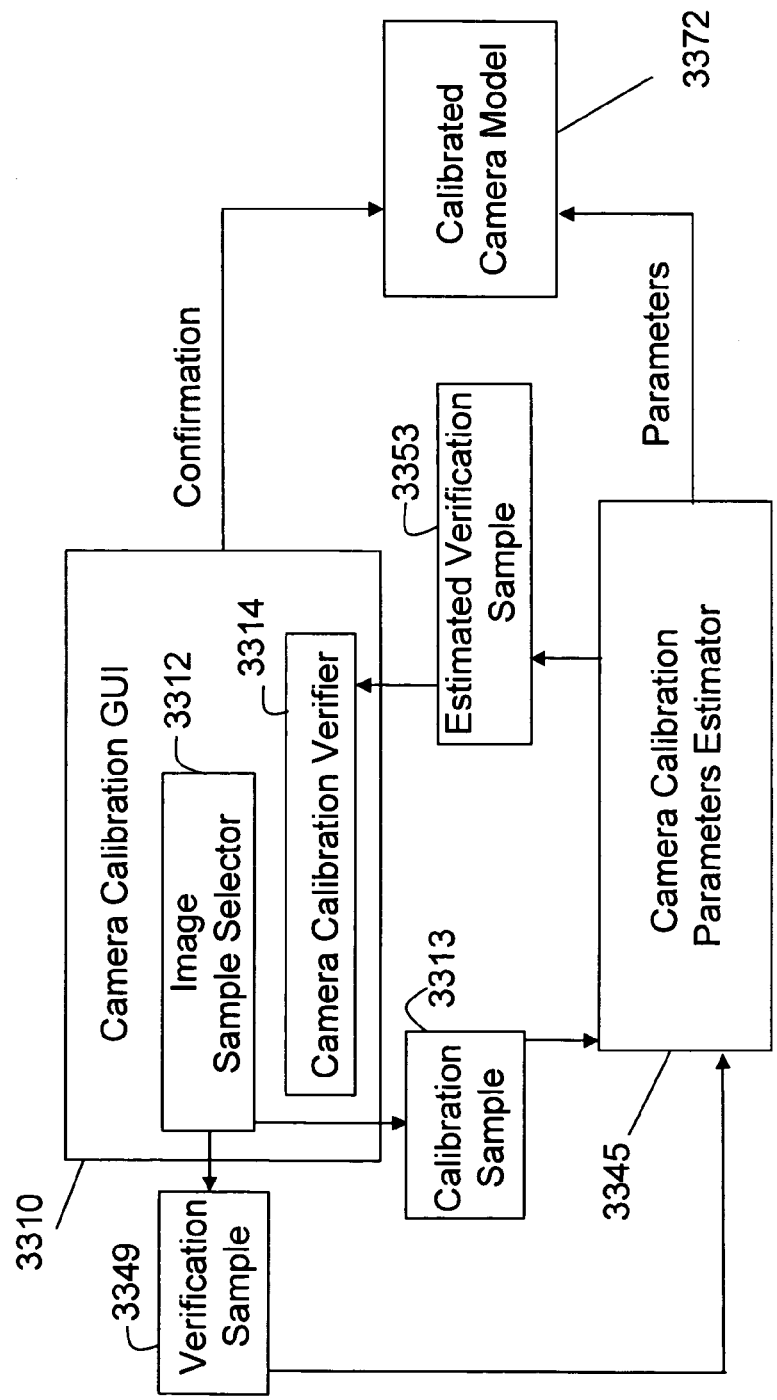
FIG. 33A illustrates an exemplary block diagram of the camera calibration module based on the image samples according to an exemplary embodiment of the invention.

FIG. 33A illustrates an exemplary block diagram of an exemplary camera calibration module based on the image samples according to an exemplary embodiment of the invention. A camera calibration graphical user interface (GUI) module 3310 may facilitate the entry of the parameters by the user and display appropriate information in a user readable format. The camera calibration GUI module 3310 may include one or more modules. For example, the camera calibration GUI module 3310 may include a calibration or verification image sample selection module or selector 3312. The calibration selection module 3312 may enable the user or operator to select calibration samples 3313 by directly marking up objects or targets on the image. For example, the user may mark the object on the image to select one input calibration sample by drawing a rectangular box around the object to designate a target bounding box, a cross sign to designate the foot image point 3252, a plus sign to designate the head image point 3250, and the like. The calibration sample selection module 3312 may enable the user or operator to select calibration samples from different frames and display the selected calibration samples, for example, in one frame using different colors.

For example, the camera calibration GUI module 3310 may include a camera calibration verification module or verifier 3314. As described in detail below, the camera calibration GUI module 3310 may display estimated calibration verification samples of the entire image frame such as display the estimated verification sample by the selected head point, foot point, or any other appropriate point.

Figure 33B:
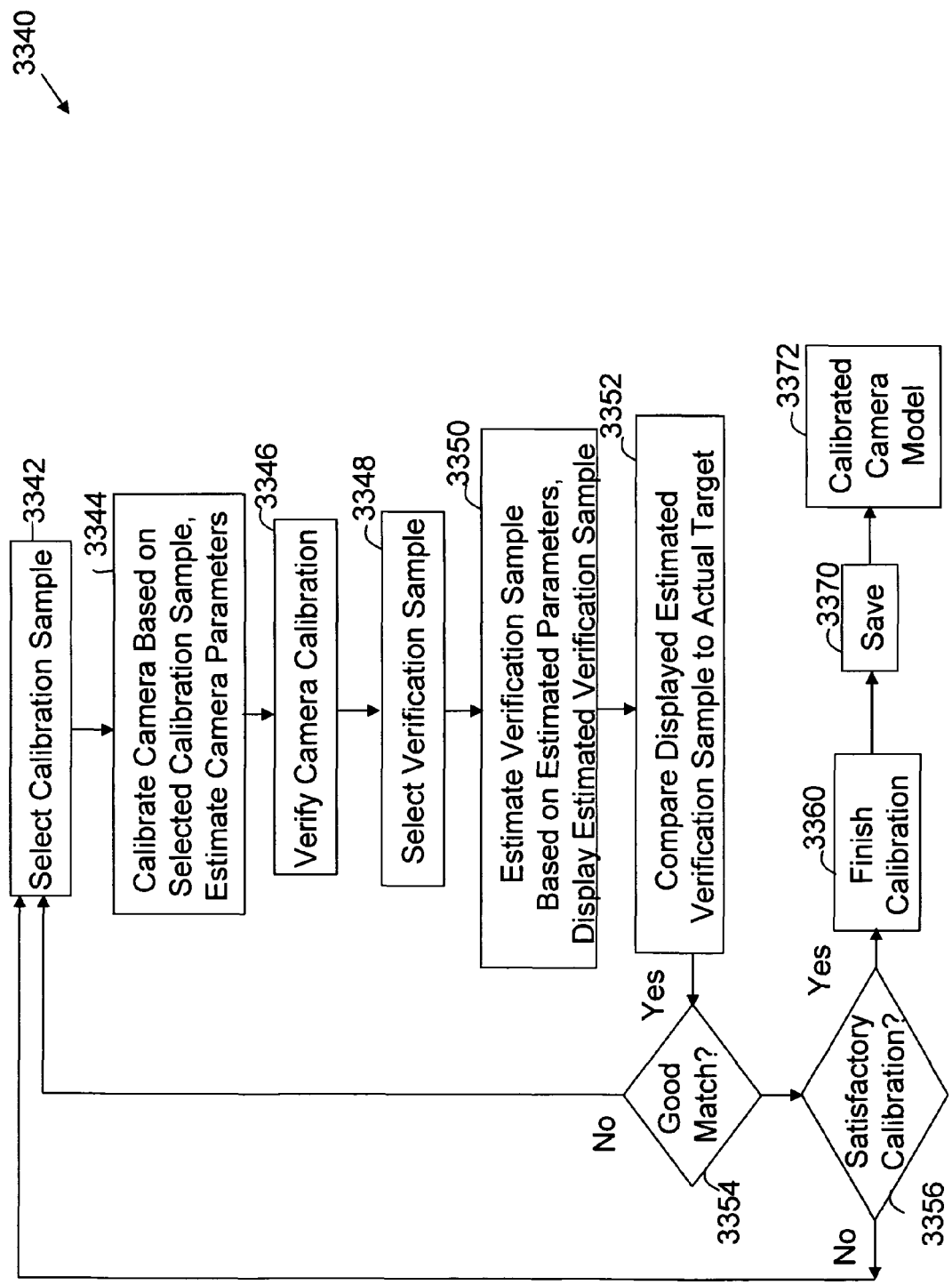
FIG. 33B illustrates an exemplary flow diagram for an exemplary calibration procedure according to an exemplary embodiment of the invention.

With continuing reference to FIG. 33A and further reference to FIG. 33B, an exemplary calibration procedure or methodology 3340 is illustrated. In block 3342, one or more calibration samples 3313 of a target may be selected in a single frame or different frames. For example, the user may select the calibration target in a video frame by drawing a rectangular bounding box around the target, and clicking on corresponding head point and/or foot point with the mouse or other appropriate input device(s). In block 3344, the camera may be calibrated based on the selected calibration sample to estimate one or more camera calibration parameters. For example, the user may click on a calibration button on the camera calibration graphical user interface (GUI) module 3310 to initiate the camera calibration 3344. The selected calibration sample or samples 3313 may be sent from the camera calibration graphical user interface (GUI) module 3310 to a camera calibration parameters estimator 3345. The camera calibration parameters estimator 3345 may estimate the best camera parameters based on the received calibration samples 3313.

In block 3346, camera calibration may be verified. For example, in block 3348, the user may randomly select one or more verification samples 3349, not previously selected as the calibration samples, in the video frames by clicking on a corresponding foot point of the target with the mouse. In block 3350, the camera calibration graphical user interface (GUI) module 3310 may display the estimated verification samples 3353 target on the frame based on the estimated camera calibration parameters.

In block 3352, one or more estimated verification samples 3353 may be compared to the actual target based on predetermined criteria. In block 3354, if the estimated verification sample 3353 target does not match the actual target within predetermined tolerance, the flow may proceed to the block 3342 and the calibration 3344 may be repeated. The user may modify the bounding box, foot and/or head point and save it as a new calibration target which may be used in block 3344 to recalibrate the camera. If, in block 3354, the estimated verification sample matches the actual target, the flow 3340 may proceed to block 3356. In block 3356, if the user is satisfied with comparing the estimated verification samples to the actual targets and wish to finish the calibration process, the user or operator may click a confirm button on the camera calibration graphical user interface (GUI) module 3310, accept the estimated camera parameters and finish calibration in block 3360. In block 3370, the calibration parameters may be saved as a calibrated camera model 3372. If, in block 3356, the user is not satisfied with comparing the estimated verification samples with the actual targets, the flow may proceed to block 3342. The user may select additional calibration samples and the camera may be recalibrated in block 3344.

Figure 34A:
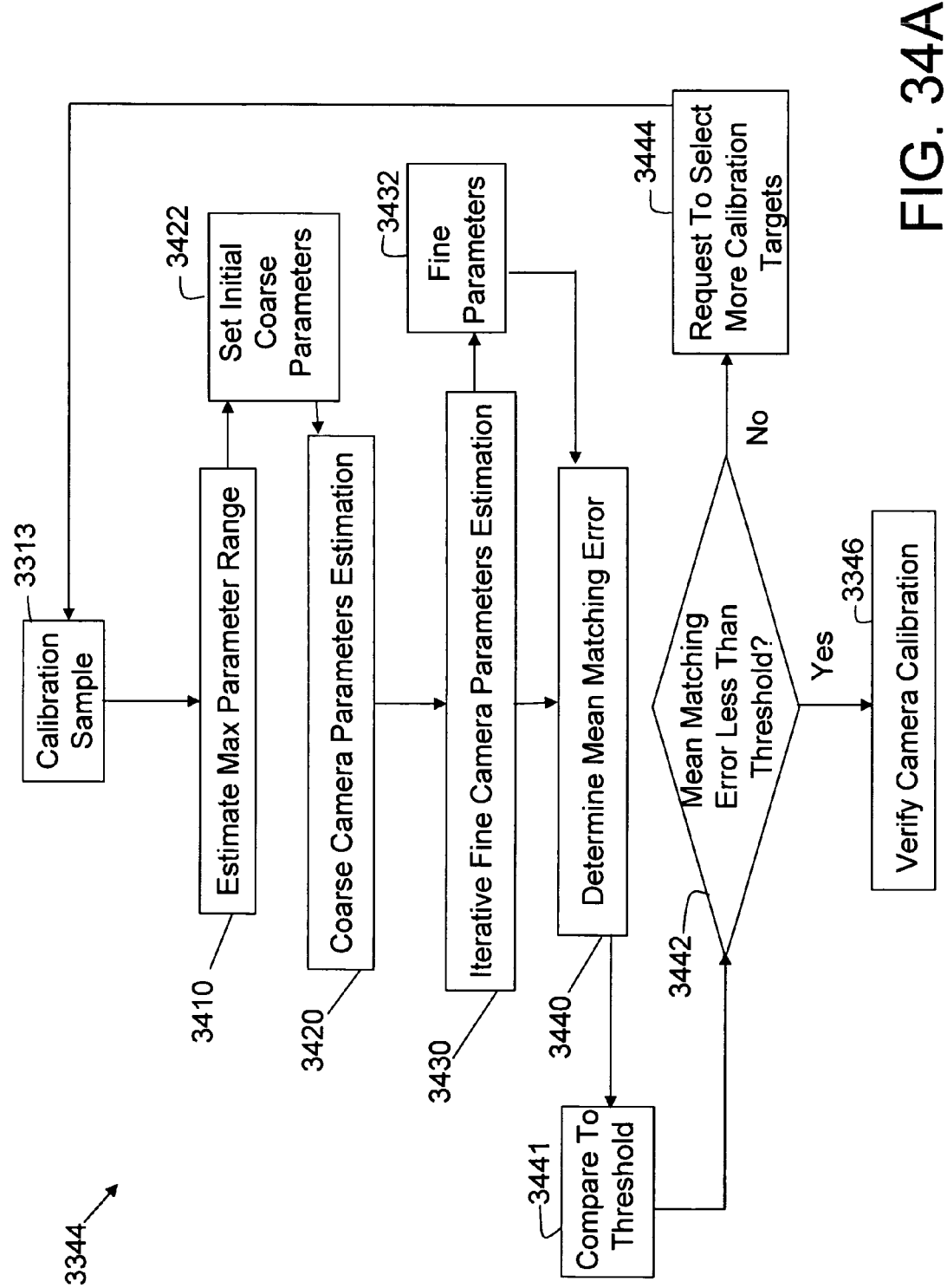
FIG. 34A illustrates an exemplary block diagram of the camera calibration parameters estimator module according to an exemplary embodiment of the invention.

With continuing reference to FIG. 33B and further reference to FIG. 34A, an exemplary calibration and parameters estimation flow 3344 for the camera calibration parameters estimator module 3345 described above with reference to FIG. 33A is illustrated according to an exemplary embodiment of the invention. In block 3410, maximum range of possible camera parameters may be estimated based on the selected calibration samples 3313 and a priori knowledge of camera physics. One advantage of estimating the range of maximum possible camera parameters is to speed up the estimation process. The range of the tilt angle $\alpha$ may be bounded by the basic assumption that the camera is not looking up. Thus, the tilt angle $\alpha$ may be within a range of −90 to +90 degrees. The tilt angle $\alpha$ may be further constrained by considering relative positions of the head and foot points 3240, 3244. If the head and foot points 3250, 3252 are disposed close to a center point of the bounding box, the tilt angle α may be relatively small. If the head and foot points 3250, 3252 are disposed close to an edge boundary of the bounding box, the tilt angle α may be relatively large.

The vertical field of view 3230 may be estimated by using the knowledge of the relative human sample size. The larger the relative human sample size as compared to the frame size, the smaller the vertical camera field of view 3230 is (or the larger the camera focal length). A minimum camera mounting height may be bounded by the basic assumption that the camera height d is equal to or greater than a vertical dimension of an average human target. An upper limit of the camera mounting height d may be also estimated by the relative human target sample sizes. For a fixed focal length estimation, a smaller human sample size may indicate a higher camera mounting height and vise versa. Since the camera height d, the camera tilt-up angle α and the camera vertical field of view 3230 estimations may be dependent on one another, initial coarse parameters may be set in block 3422. The camera mounting height d may be set, for example, equal to 2 m. The camera vertical field of view 3230 may be set as equal to, for example, ¼ of the camera height d or 0.5 m. The tilt-up angle α may be set as a variable based on current estimated camera parameters. The coarse camera height parameter may be greater when the camera height d is greater, and/or the focal length is shorter and/or the tilt-up angle α is closer to 0.

In block 3420, a coarse camera parameters estimation may be performed by looping through all possible ranges for the camera height d, the camera tilt-up angle α and the camera vertical field of view 3230 using coarse parameters. In block 3430, fine camera parameters 3432 may be estimated iteratively. For example, a number of iterations may be 2, 3, 4, 5, etc. For each iteration, the upper and lower ranges of each parameter may be determined by the best estimated parameter and step up from the previous iteration. A value of the new step may be increased by a fraction of the step value in the previous iteration, for example, approximately 1/10 of the previous step. For example, the value of each step may increase as 2.0, 2.2, 2.4, 2.7, 2.9, etc.

In block 3440, the mean matching error may be determined using the estimated fine camera parameters. In block 3441, the determined mean matching error may be compared to a predetermined mean matching error threshold. If, in block 3442, the mean matching error is less than the predetermined mean matching error threshold, the flow may proceed to the block 3346 for the camera verification. If, in block 3442, the mean matching error is greater than or equal to the predetermined mean matching error threshold, the user may be asked to select additional calibration targets in block 3444 and calibration and parameters estimation process 3344 may be repeated.

Figure 34B:
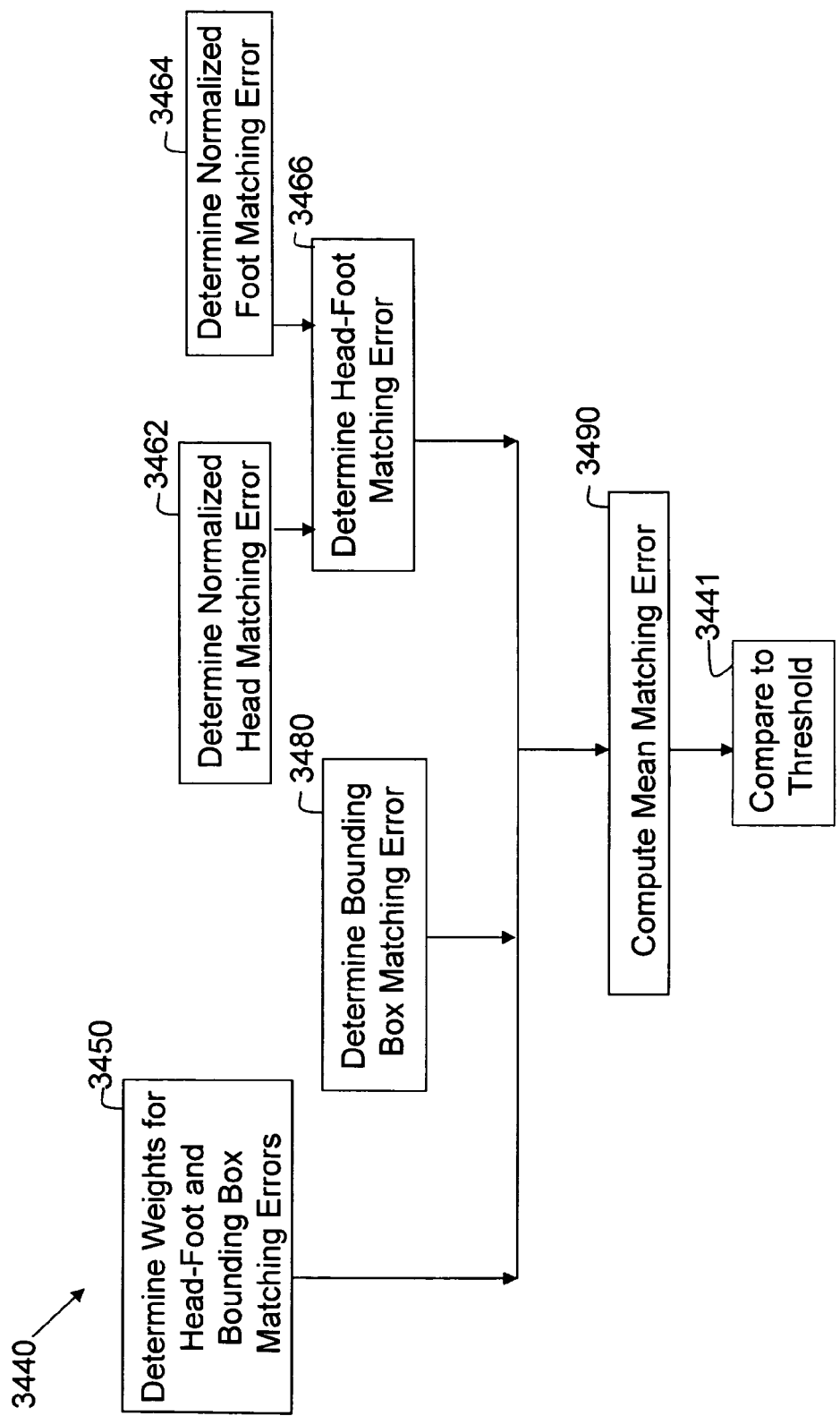
FIG. 34B illustrates an exemplary block diagram for determining a mean matching error according to an exemplary embodiment of the invention.

With continuing reference to FIG. 34A and further reference to FIG. 34B, an exemplary mean sample matching error determination flow 3440 is illustrated. The mean matching error E(i) for each sample i may be computed by adding up a weighted average of a head-foot matching error $E_{hf}(i)$ and a weighted average of a bounding box matching error $E_{bb}(i)$:

$$E(i)=W_{hf}*E_{hf}(i)+W_{bb}*E_{bb}(i), \quad (1)$$

where the weights $W_{hf}$ and $W_{bb}$ represent respective weights for the head-foot matching error and the bounding box matching error.

The weights $W_{hf}$ and $W_{bb}$ for the head-foot matching error and the bounding box matching error may be determined by the location of the sample head and foot points comparing to the sample bounding box. If $D_{bb}$ is a diagonal length of the sample bounding box and $D_{hf}$ is the image distance between the head point and foot point, the head-foot and the bounding box weights may be determined in block 3450 as:

$$W_{hf}=0.5*(D_{hf}/D_{bb}+0.5), \text{ and } W_{bb}=1-W_{hf} \quad (2)$$

In block 3462, a normalized head matching error $E_h$ may be determined as a distance between the head point of the observed sample and the head point of the computed sample estimated using the observed foot point and the estimated camera model, and normalized by a mean radius of the observed sample $R_m$, which may be defined as:

$$R_m=\text{sqrt}(B_w*B_h/4.0), \text{ where} \quad (3)$$

$B_w$ and $B_h$ are the width and height of the sample bounding box respectively.

In block 3464, a normalized foot matching error $E_f$ may be determined as a distance between the foot point of the observed sample and the foot point of the computed sample estimated using the observed head point and the estimated camera model and normalized by the mean radius of the observed sample determined with equation (3).

In block 3466, the head-foot matching error $E_{hf}$ may be determined as a mean of the normalized head matching error $E_h$ and the normalized foot matching error $E_f$.

In block 3480, the bounding box matching error $E_{bb}$ may be determined as:

$$E_{bb}=R_{overlap}/\text{Max}(R_{observe}, R_{estimate}), \text{ where} \quad (4)$$

$R_{observe}$ is the bounding box area of the observed human sample, $R_{estimate}$ is the bounding box area of the estimated human sample using the center of the observed bounding box and the estimated camera model, and $R_{overlap}$ is the overlapping area between the observed bounding box and estimated bounding box.

In block 3490, the mean matching error E(i) for each sample i may be determined based on equation (1). The mean matching error substantially depends on the camera parameters estimation errors and the human sample variations. Since human height and size variation is typically within 20% of the average, the mean matching error threshold may be set, for example, to 0.3 to determine whether the estimated camera model is accurate. A mean matching error which is less than the mean matching error threshold may indicate that the estimation is substantially accurate at least within the area populated by the input calibration samples. Further user/operator verification step may be performed using the camera calibration GUI 3310 as illustrated in FIG. 33A. If the mean matching error is equal to or greater than the mean matching error threshold, the selected calibration samples may be inaccurate or the size and height variations of the selected calibration samples are too great, the system may ask the user/operator to provide more calibration samples for better estimation of the camera calibration parameters.

Figure 35A:
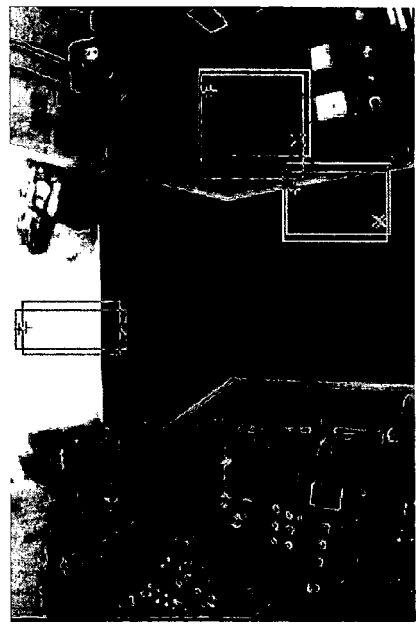
FIGS. 35A, 35B and 35C illustrate human samples in typical camera views according to an exemplary embodiment of the invention.
Figure 35B:
Figure 35C:
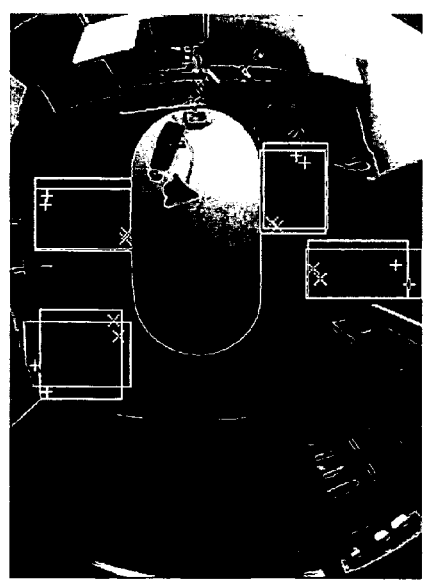

FIGS. 35A, 35B and 35C illustrate human samples in typical camera views with the camera tilt-up angle approximately 90, 45, and 0 degrees, respectively. Each group of rectangles, "x" sign and "+" sign may indicate one human sample, where a rectangle may indicate the bounding box, "x" may indicate the foot point and "x" may indicate the head point.

Figure 36:
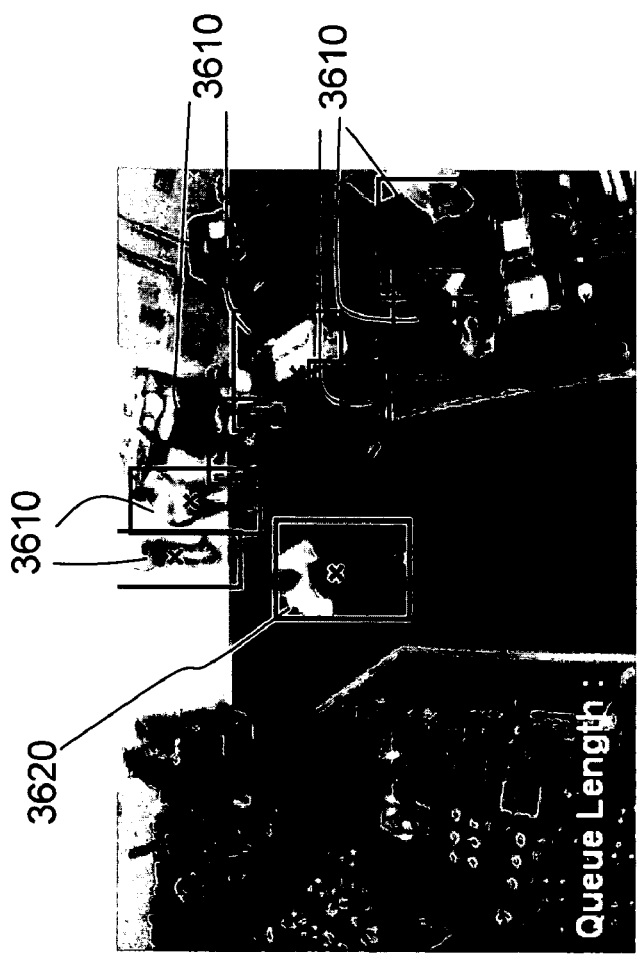
FIG. 36 illustrates an exemplary frame from a video stream from the queue length estimation video surveillance system according to an exemplary embodiment of the invention.

As another exemplary embodiment, the invention and the system described in FIG. 30 may be used for queue length estimation. FIG. 36 illustrates a camera view scenario for queue length estimation at register counter in a retail application, according to this exemplary embodiment of the invention. In this example, the user may provide the register counter location and customer waiting area in the camera view. The event detection and counting module 3005 may detect any stopped, e.g., waiting human target 3610 in the defined area and count the total number of the human targets, e.g., seven in this example. A moving target 3620 may be not counted. A real time alert may be sent to a pre-defined external receiver, such as, for example, a store manager when queue length is exceeding a pre-defined threshold. The queue length data may be logged into the database 3007 for later query or data analysis by the store management and the like.

The examples and embodiments described herein are non-limiting examples.

The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A method for video processing, comprising:
   determining a set of calibration parameters for a video camera, comprising:
      selecting a calibration sample in a video frame,
      estimating coarse calibration parameters,
      iteratively estimating fine calibration parameters based on the estimated coarse calibration parameters,
      determining mean matching error based on the estimated fine calibration parameters,
      comparing the mean matching error to a predetermined threshold,
      based on the comparison, estimating a verification target,
      selecting a calibration verification sample in the video frame, the calibration verification sample being different from the selected calibration sample,
      comparing the estimated verification target with the selected calibration verification sample, and
      one of accepting the calibration parameters or determining a new set of calibration parameters;
   receiving video of a scene from the video camera;
   detecting moving pixels in the video;
   detecting line segments or motion blocks in the video based on the detected moving pixels;
   identifying targets in the video based on the detected line segments or motion blocks;
   tracking targets in the video based on the identified targets; and
   managing the tracked targets in the video;
   wherein a computer or application-specific hardware performs said receiving video, detecting moving pixels, detecting line segments or motion blocks, identifying targets, tracking targets, and managing the tracked targets.

2. A non-transitory computer-readable medium comprising software for video processing, the medium comprising:
   instructions for determining a set of calibration parameters for a video camera, comprising:
      instructions for receiving a calibration sample from a video frame,
      instructions for estimating coarse calibration parameters,
      instructions for iteratively estimating fine calibration parameters based on the estimated coarse calibration parameters,
      instructions for determining mean matching error based on the estimated fine calibration parameters,
      instructions for comparing the mean matching error to a predetermined threshold,
      instructions for estimating a verification target based on the comparison,
      instructions for receiving a calibration verification sample from the video frame, the calibration verification sample being different from the calibration sample,
      instructions for comparing the estimated verification target with the determined calibration verification sample, and
      instructions for one of accepting the calibration parameters or determining a new set of calibration parameters;
   instructions for receiving video of a scene from the video camera;
   instructions for detecting moving pixels in the video;
   instructions for detecting line segments or motion blocks in the video based on the detected moving pixels;
   instructions for identifying targets in the video based on the detected line segments or motion blocks;
   instructions for tracking targets in the video based on the identified targets; and
   instructions for managing the tracked targets in the video.

3. The method of claim 1, wherein said detecting line segments comprises:
   counting edge pixels; and
   identifying a line segment based on the edge pixels by identifying a start point, predicting next search directions, identifying a next line pixel, and providing a line segment.

4. The method of claim 1, wherein said detecting motion blocks comprises:
   determining coarse motion blocks; and
   determining fine motion blocks.

5. The method of claim 1, wherein said tracking targets comprises:
   (A) updating existing targets by:
      predicting a target,
      assigning a line segment to the predicted target, and
      updating the target;
   (B) detecting new targets by:
      performing line segment clustering,
      performing cluster verification based on the line segment clustering, and
      generating a new target based on the cluster verification;
   (C) refining at least one of the updated or new targets by:
      agglomerating remaining line segments to nearest targets,
      re-estimating the targets, and
      updating the targets;
   (D) merging or splitting the updated targets, wherein merging the updated targets is performed by:
      obtaining a target pair,
      comparing the obtained targets, and
      merging the target pair if parameters of the target pair are similar; and
   wherein splitting the updated targets is performed by:
      obtaining a target,
      comparing the obtained target to a pre-defined target,
      splitting the obtained target into sub-targets if the obtained target is not similar to the pre-defined target,
      comparing each sub-target to the pre-defined target, and
      assigning target identities to each sub-target similar to the pre-defined target;

(E) merging or splitting the new targets by:
  generating a foreground mask,
  detecting foreground objects based on the foreground mask, and
  analyzing the foreground objects to obtain new targets by comparing the foreground objects to a multiple target size threshold, a minimum single target size threshold, or a maximum single target size threshold; and
(F) cleaning the merged or split targets by:
  (a) obtaining a target,
  (b) verifying the obtained target being detected in a current frame,
  (c) verifying the obtained target not to be moving out of a field of view of a video camera in a previous frame, and one of
  (d) maintaining the obtained target or removing the obtained target based at least on one of the step (b) or step (c).

6. The method of claim 1, wherein said tracking targets comprises:
  identifying a motion state for each target; and
  identifying a transition from the motion state of each target, wherein the motion state for each target is one of a moving state, a stopped state, or a stationary state.

7. The method of claim 1, wherein said tracking targets comprises: tracking each target based on a motion state history for each target.

8. The method of claim 1, wherein said identifying targets comprises:
  performing change detection on the video to obtain a change mask and a background image;
  performing motion detection on the video to obtain a motion mask;
  generating a foreground edge detection region mask based on the change mask and the motion mask by:
    performing a logical operation on the change mask and the motion mask to obtain a change-or-motion mask;
    performing edge detection on the background image to obtain a background edge mask;
    performing a logical operation on the background edge mask to obtain a background non-edge mask; and
    performing a logical operation on the change-or-motion mask and the background non-edge mask to obtain the foreground edge detection region mask;
  performing foreground edge detection based on the foreground edge detection region mask to obtain detected foreground edges;
  performing line segment detection based on the detected foreground edges to obtain detected line segments;
  performing convex region detection based on the detected line segments to obtain detected convex regions; and
  generating a foreground region mask based on the detected convex regions and the change-or-motion mask.

9. The method of claim 8, wherein said performing convex region detection comprises:
  generating convex regions from line segments;
  merging change connecting convex regions by:
    identifying a smallest unprocessed convex region,
    identifying valid neighboring convex regions of the smallest unprocessed convex region,
    identifying connecting line segments between the valid neighboring convex regions and the smallest unprocessed convex region,
    identifying change connecting line segments based on the connecting line segments,
    identifying a closest change connecting convex region based on the change connecting line segments, and
    merging the closest change connecting convex region and the smallest unprocessed convex region; and
  merging spatial connecting convex regions.

10. The method of claim 1, further comprising:
  receiving an access code entry;
  identifying a video tripwire in the scene;
  detecting when one or more identified targets cross the video tripwire;
  matching each detected target with each received access code entry; and
  generating an alarm when the detected target does not match the received access code entry.

11. The method of claim 1, further comprising:
  counting the identified targets; and
  monitoring and adjust at least one of a lighting, air-conditioning, heating or ventilating system based on the counted targets.

12. The method of claim 1, further comprising:
  detecting at least one of a stationary or moving identified targets in the scene;
  counting the detected stationary targets;
  estimating a dwell time based on the counted stationary targets;
  recording the estimated dwell time; and
  recording the dwell time in a log.

13. The method of claim 1, further comprising:
  using a video camera to obtain the video of the scene.

14. The method of claim 1, further comprising:
  using a graphical user interface to provide images of targets and facilitate a selection of a calibration sample and a calibration verification sample by a user in a video frame, the calibration verification sample being different from the selected calibration sample.

15. The method of claim 1, further comprising:
  using a camera calibration module to facilitate a selection of a calibration sample and a calibration verification sample in a video frame, the calibration verification sample being different from the calibration sample.

* * * * *